(12) United States Patent
Pang et al.

(10) Patent No.: US 11,357,056 B2
(45) Date of Patent: Jun. 7, 2022

(54) RANDOM ACCESS METHOD AND APPARATUS

(71) Applicant: Huawei Technologies Co., Ltd., Shenzhen (CN)

(72) Inventors: Gaokun Pang, Shenzhen (CN); Qiang Fan, Shanghai (CN); Ping Fang, Shenzhen (CN); Yong Cheng, Shenzhen (CN); Xiaoxian Li, Shenzhen (CN); Chong Lou, Shanghai (CN); Qufang Huang, Shanghai (CN); Qinghai Zeng, Shanghai (CN); Yinghao Guo, Shanghai (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 77 days.

(21) Appl. No.: 16/758,552

(22) PCT Filed: Oct. 27, 2018

(86) PCT No.: PCT/CN2018/112273
§ 371 (c)(1),
(2) Date: Apr. 23, 2020

(87) PCT Pub. No.: WO2019/080939
PCT Pub. Date: May 2, 2019

(65) Prior Publication Data
US 2020/0351946 A1    Nov. 5, 2020

(30) Foreign Application Priority Data

Oct. 27, 2017  (CN) .......................... 201711023955.9
Dec. 21, 2017  (CN) .......................... 201711395730.6

(51) Int. Cl.
*H04W 72/04*    (2009.01)
*H04W 74/08*    (2009.01)
*H04W 74/00*    (2009.01)

(52) U.S. Cl.
CPC ..... *H04W 74/0833* (2013.01); *H04W 72/042* (2013.01); *H04W 72/0453* (2013.01); *H04W 74/006* (2013.01)

(58) Field of Classification Search
CPC ..... H04W 74/08; H04W 74/00; H04W 72/04; H04W 74/0833; H04W 72/0453; H04W 72/042; H04W 74/006
See application file for complete search history.

(56) References Cited

U.S. PATENT DOCUMENTS

| | | | |
|---|---|---|---|
| 2013/0077484 A1* | 3/2013 | Zhao | H04W 4/20 370/230 |
| 2014/0233538 A1* | 8/2014 | Zhang | H04W 72/1205 370/336 |

(Continued)

FOREIGN PATENT DOCUMENTS

| | | |
|---|---|---|
| CN | 102282902 A | 12/2011 |
| EP | 3547559 A1 | 10/2019 |

(Continued)

OTHER PUBLICATIONS

Huawei, et al., "User plane impacts for Bandwidth Parts", 3GPP TSG-RAN WG2 #99bis, R2-1710217, Prague, CZ, Oct. 9-13, 2017, 6 pages.

(Continued)

*Primary Examiner* — Chi Ho A Lee
(74) *Attorney, Agent, or Firm* — Conley Rose, P.C.

(57) ABSTRACT

A random access method includes working, by a user equipment (UE), on a first bandwidth part (BWP), where the first BWP is a currently active BWP, when the UE needs to perform a random access procedure, the UE performs the (Continued)

random access procedure on an initial BWP or on the first BWP, and when the UE receives BWP switching indication information from a network device instructing the UE to use a second BWP when performing the random access procedure on the first BWP, continuing, by the UE, to perform the random access procedure on the first BWP, or stopping, by the UE, performing the random access procedure on the first BWP, and performing the random access procedure on the second BWP.

20 Claims, 5 Drawing Sheets

(56) References Cited

U.S. PATENT DOCUMENTS

| | | | |
|---|---|---|---|
| 2015/0139196 A1 | 5/2015 | Liu et al. | |
| 2018/0049243 A1* | 2/2018 | Lee | H04W 72/042 |
| 2019/0044689 A1* | 2/2019 | Yiu | H04W 72/042 |
| 2019/0089579 A1* | 3/2019 | Sang | H04W 76/27 |
| 2019/0364602 A1* | 11/2019 | Yi | H04W 72/1278 |
| 2020/0252971 A1* | 8/2020 | Wu | H04L 5/0053 |
| 2020/0313832 A1* | 10/2020 | Kim | H04W 72/042 |
| 2020/0374960 A1* | 11/2020 | Deenoo | H04W 72/14 |

FOREIGN PATENT DOCUMENTS

| | | |
|---|---|---|
| EP | 3629492 A1 | 4/2020 |
| WO | 2019083277 A1 | 5/2019 |

OTHER PUBLICATIONS

Intel Corporation, "Remaining details for bandwidth parts", 3GPP TSG RAN WG1 Meeting 90bis, R1-1717400, Prague, CZ, Oct. 9-13, 2017, 4 pages.

Huawei, et al., "Bandwidth part activation and adaptation", 3GPP TSG RAN WG1 Meeting #90bis, R1-1717905, Prague, Czech Republic, Oct. 9-13, 2017, 7 pages.

RAN WG2, "Presentation of Specification/Report to TSG: TS 38.321, Version 1.0.0" 3GPP TSG-RAN Meeting #77, RP-171733, Sapporo, Japan, Sep. 11-14, 2017, 1 page.

3GPP TS 38.321 V1.0.0, 3rd Generation Partnership Project; Technical Specification Group Radio Access Network; NR; Medium Access Control (MAC) protocol specification (Release 15), Sep. 4, 2017, 46 pages.

R2-1713879, LG Electronics Inc, "Summary of E-mail discussion on [99bis#43][NR UP/MAC] Impact of BWP," 3GPP TSG-RAN WG2 Meeting #100, Reno, USA, Nov. 27-Dec. 1, 2017, 35 pages.

R2-1712433, ZTE Corporation, "Consideration on the autonomous BWP switch," 3GPP TSG-RAN WG2 Meeting #100, Reno, USA, Nov. 27-Dec. 1, 2017, 5 pages.

* cited by examiner

RANDOM ACCESS METHOD AND APPARATUS

CROSS-REFERENCE TO RELATED APPLICATIONS

This application is a U.S. National Stage of International Patent Application No. PCT/CN2018/112273 filed on Oct. 27, 2018, which claims priority to Chinese Patent Application No. 201711395730.6 filed on Dec. 21, 2017 and Chinese Patent Application No. 201711023955.9 filed on Oct. 27, 2017. All of the aforementioned applications are hereby incorporated by reference in their entireties.

TECHNICAL FIELD

This application relates to the field of communications technologies, and in particular, to a random access method and apparatus.

BACKGROUND

A concept of a bandwidth part (bandwidth part, BWP) is introduced to a new radio (New Radio, NR) radio access network. When a bandwidth of a cell is very high, UE (User Equipment) may work on only a part of the bandwidth of the cell. Each part of the bandwidth of the cell is referred to as a BWP, as shown in FIG. 1. Each BWP correspondingly supports one physical layer parameter, which may be referred to as numerology (numerology). The numerology includes subcarrier spacing configuration and cyclic prefix length configuration. Different BWPs may support same numerology or different numerology.

In an NR mobile communications system, initially accessing a system by the UE mainly includes three important steps: (1) an initial synchronization and cell search process; (2) a network sends basic system information; and (3) a random access (Random Access, RA) procedure. How the UE uses a BWP when the UE needs to perform an RA procedure is a problem that needs to be urgently resolved.

SUMMARY

Embodiments of this application provide a random access method and apparatus, to resolve a problem of how UE uses a BWP when the UE needs to perform an RA procedure.

The embodiments provided in this application include any one of the following:

1. A random access method, applied to UE, where the method includes:

working, by the UE, on a first bandwidth part BWP, where the first BWP is a currently active BWP; and when the UE needs to perform a random access procedure, performing, by the UE, the random access procedure on an initial BWP if the first BWP does not meet a condition for performing a random access procedure; or performing, by the UE, the random access procedure on the first BWP if the first BWP meets a condition for performing a random access procedure; and the method further includes:

when the UE performs the random access procedure on the first BWP, receiving, by the UE. BWP switching indication information sent by a network device, where the BWP switching indication information is used to instruct the UE to use a second BWP; and continuing, by the UE, to perform the random access procedure on the first BWP; or stopping, by the UE, performing the random access procedure on the first BWP, and performing, by the UE, the random access procedure on the second BWP.

In the method, the UE currently works on the first BWP, and when the UE needs to perform the random access procedure, the UE can select, based on whether the first BWP meets a condition for performing a random access procedure, a BWP used to perform the random access procedure. Further, after the UE receives the BWP switching indication information when performing the random access procedure on the first BWP, the UE can choose whether to continue to complete the random access procedure on the first BWP, or to switch to the second BWP to perform the random access procedure, so as to ensure that the UE can complete random access in a timely manner. Specifically, if the first BWP does not meet the condition for performing a random access procedure, the UE may choose to perform the RA procedure on the initial BWP; or if the first BWP meets the condition for performing a random access procedure, the UE may choose to perform the RA procedure on the currently active first BWP. If the UE chooses to perform the RA procedure on the first BWP, and if the UE receives, when the UE performs the random access procedure on the first BWP, the BWP switching indication information (used to instruct the UE to use the second BWP) sent by the network device, the UE may continue to perform the random access procedure on the first BWP, or the UE may choose to switch from the first BWP to the second BWP to perform the RA procedure. The method provides a solution of how the UE uses a BWP when the UE needs to perform an RA procedure, so that the UE can quickly complete the random access procedure.

2. The method according to Embodiment 1, where the performing, by the UE, the random access procedure on an initial BWP includes: performing, by the UE, the random access procedure on the initial BWP if the initial BWP meets the condition for performing a random access procedure.

According to the method provided in this application, if the first BWP on which the UE currently works does not meet the condition for performing a random access procedure, and the initial BWP meets the condition for performing a random access procedure, the UE may choose to switch to the initial BWP to perform the RA procedure, so that the random access procedure is quickly implemented.

3. The method according to Embodiment 1 or 2, where the performing, by the UE, the random access procedure on the second BWP includes:

performing, by the UE, the random access procedure on the second BWP if the second BWP meets the condition for performing a random access procedure.

According to the method provided in this application, after the UE receives the BWP switching indication information sent by the network device, where the BWP switching indication information is used to instruct the UE to use the second BWP, when the second BWP meets the condition for performing a random access procedure, the UE may choose to switch to the second BWP to perform the RA procedure. In this way, it can be ensured that the RA procedure is successfully implemented.

4. The method according to any one of Embodiments 1 to 3, where the meeting the condition for performing a random access procedure includes at least one of the following two:

a resource used for random access is available; or a common search space CSS used to receive a random access response RAR is available.

According to the method provided in this application, if a resource used for random access is available (or is configured) in a BWP, the BWP may be used to perform the random access procedure; or if a CSS is available in a BWP, the BWP may be used to perform the random access procedure.

5. The method according to any one of Embodiments 1 to 4, where that the condition for performing a random access procedure is not met includes at least one of the following two: no resource used for random access is configured; or no common search space CSS used to receive a random access response RAR is configured.

According to the method provided in this application, if the resource used for random access is not available in a BWP, the UE may quickly determine that the random access procedure cannot be initiated on the BWP, or if the CSS used to receive an RAR is not available in a BWP, the UE may quickly determine that downlink information cannot be received on the BWP, so that the UE selects a BWP meeting the condition for performing a random access procedure, to implement the random access procedure.

6. The method according to any one of Embodiments 1 to 5, where the performing, by the UE, the random access procedure on the first BWP includes at least any one of the following:

skipping, by the UE, deactivating the first BWP;

keeping, by the UE, the first BWP activated;

stopping, by the UE, a bandwidth part inactivity timer used to maintain the first BWP;

continuing to use a value of a power ramping counter of the user equipment;

continuing to use a backoff parameter of the user equipment;

using, by the UE, a random access priority corresponding to the first BWP, and adjusting at least one of the following based on at least the random access priority corresponding to the first BWP: the backoff parameter, a power increment value, the power ramping counter, and a preamble counter;

continuing, by the UE, to use a first transmit beam, where the first beam is a transmit beam used by the UE before or when the UE receives the switching indication information; and switching, by the UE, from the first transmit beam to a second transmit beam, where the second transmit beam is different from the first transmit beam.

According to the method provided in this embodiment of this application, a parameter setting of the UE is specified when the UE performs a random procedure on the first BWP. Specifically, in a possible implementation, the performing, by the UE, the RA procedure on the first BWP may include: stopping, by the UE, the bandwidth part inactivity timer used to maintain the first BWP. In this way the following case can be prevented: when the UE performs the RA procedure on the first BWP, because the UE may need to switch to a default BWP if the bandwidth part inactivity timer continues to run, instability is caused to the RA procedure currently performed on the first BWP.

In a possible implementation, the performing, by the UE, the RA procedure on the first BWP may include: keeping, by the UE, the first BWP in an activated state. In this way, consistency with a state machine of the UE can be ensured, to prevent inconsistent actions performed by the UE in different states In a possible implementation, the UE performs the RA on the currently working first BWP, and may continue to use a parameter (for example, the value of the power ramping counter of the user equipment, or the backoff parameter of the user equipment) used before the RA is performed, so as to prevent impact of instability caused to a system by a change of the parameter of the UE device, and avoid interference to a network, and unfair contention.

In a possible implementation, the UE continues to use the first transmit beam, so that an access procedure of the UE can be accelerated. In another possible implementation, the UE may switch from the first transmit beam to the second transmit beam, so that the UE obtains a better reception gain.

7. The method according to any one of Embodiments 1 to 6, where the network device configures a default BWP for the UE, the default BWP includes a default downlink BWP, and the first BWP includes a first downlink BWP; and the first downlink BWP is different from the default downlink BWP.

According to the method provided in this application, that the first downlink BWP is different from the default downlink BWP may be used to distinguish an object specific to a bandwidth part inactivity timer (if the UE currently works on the first bandwidth part BWP, the object specific to the current bandwidth part inactivity timer is the first downlink BWP), to prevent the bandwidth pan inactivity timer from being blindly started and/or stopped.

8. The method according to any one of Embodiments 1 to 7, where the performing, by the UE, the RA procedure on the second BWP includes at least any one of the following:

setting, by the UE, the power ramping counter to an initial value;

setting, by the UE, the backoff parameter to an initial value, or setting the backoff parameter to a value in a backoff indicator;

using, by the UE, a random access priority corresponding to the second BWP, and adjusting at least one of the following based on at least the random access priority corresponding to the second BWP: the backoff parameter, the power increment value, the power ramping counter, and the preamble counter;

continuing, by the UE, to use the first transmit beam, where the first beam is a transmit beam used by the UE before or when the UE receives the switching indication information or before the UE switches to the second BWP; and switching, by the UE, from the first transmit beam to the second transmit beam, where the second transmit beam is different from the first transmit beam.

According to the method provided in this application, the UE switches to the second BWP to perform the RA procedure, the UE may initialize the used parameter, and the UE may not need to reserve the previously used parameter such as the value of the power ramping counter or backoff parameter initialization, to avoid incompatibility with the previous random access procedure. The UE may continue to use the first transmit beam, so that the RA procedure of the UE is accelerated; or the UE may choose to switch to the second transmit beam, so that the UE obtains a better reception gain. The UE performs the RA procedure on the second BWP and performs one or more of the parameter settings of the UE, so that the UE can better implement interworking, and the user equipment implements standardization of the random access procedure, to reduce impact caused by the user equipment to the network.

9. The method according to any one of Embodiments 1 to 7, where the performing, by the UE, the RA procedure on the second BWP includes at least any one of the following:

continuing to use the value of the power ramping counter of the user equipment;

continuing to use the backoff parameter of the user equipment;

using, by the UE, a random access priority corresponding to the second BWP, and adjusting at least one of the following based on at least the random access priority corresponding to the second BWP: the backoff parameter, the power increment value, the power ramping counter, and the preamble counter;

continuing, by the UE, to use the first transmit beam, where the first beam is a transmit beam used by the UE before or when the UE receives the switching indication information or before the UE switches to the second BWP; and switching, by the UE, from the first transmit beam to the second transmit beam, where the second transmit beam is different from the first transmit beam.

According to the method provided in this application, when the UE performs the RA procedure on the second BWP, the UE continues to use some original parameters, for example, continues to use the value of the power ramping counter and the backoff parameter. In this way, impact of instability caused to the system by a change of the parameter used by the UE can be prevented, interference caused to the network can be avoided, and unfair contention can be avoided. The UE continues to use the first transmit beam, so that the random access procedure of the UE can be accelerated. The UE switches to the second transmit beam, so that the UE can obtain a better reception gain, and the UE implements standardization of the random access procedure, to reduce impact caused by the UE to the network.

10. The method according to any one of Embodiments 1 to 9, where the performing, by the UE, the RA procedure on an initial BWP includes at least any one of the following:

setting, by the UE, the power ramping counter to the initial value;

setting, by the UE, the backoff parameter to the initial value, or setting the backoff parameter to the value in the backoff indicator, using, by the UE, a random access priority corresponding to the initial BWP, and adjusting at least one of the following based on at least the random access priority corresponding to the initial BWP: the backoff parameter, the power increment value, the power ramping counter, and the preamble counter;

continuing, by the UE, to use the first transmit beam, where the first beam is a transmit beam used by the UE before the UE switches to the initial BWP; and switching, by the UE, from the first transmit beam to the second transmit beam, where the second transmit beam is different from the first transmit beam.

According to the method provided in this application, when performing the RA procedure on the initial BWP, the UE initializes some used parameters, for example, initializes the value of the power ramping counter and the backoff parameter. In this way, the UE may not need to keep the parameters, and incompatibility with the original random access procedure is avoided, so that the UE implements standardization of the random access procedure, to reduce impact caused by the UE to the network.

11. The method according to any one of Embodiments 1 to 10, where the first BWP includes a first uplink UL BWP and/or a first downlink BWP, and the second BWP includes a second uplink UL BWP and/or a second downlink BWP;

that the BWP switching indication information is used to instruct the UE to use the second BWP includes that the BWP switching indication information is used to instruct the UE to use the second uplink UL BWP; or the BWP switching indication information is used to instruct the UE to use the second downlink BWP, or the BWP switching indication information is used to instruct the UE to use the second uplink UL BWP and the second downlink BWP; and the BWP switching indication information is further used to instruct the UE to switch the first uplink UL BWP, or the BWP switching indication information is further used to instruct the UE to switch the first downlink BWP, or the BWP switching indication information is further used to instruct the UE to switch the first uplink UL BWP and the first downlink BWP.

According to the method provided in this application, the UE may switch to an indicated specific BWP based on different cases flexibly indicated in the BWP switching indication information.

12. A random access apparatus, where the apparatus is user equipment UE, the UE includes a processing unit and a receiving unit, the UE works on a first bandwidth part BWP, and the first BWP is a currently active BWP;

the processing unit is configured to: when the UE needs to perform a random access procedure, if the first BWP does not meet a condition for performing a random access procedure, enable the UE to perform the random access procedure on an initial BWP; or if the first BWP meets a condition for performing a random access procedure, enable the UE to perform the random access procedure on the first BWP;

the receiving unit is configured to: when the UE performs the random access procedure on the first BWP, receive BWP switching indication information sent by a network device, where the BWP switching indication information is used to instruct the UE to use a second BWP; and the processing unit is further configured to: after the receiving unit receives the BWP switching indication information, enable the UE to continue to perform the random access procedure on the first BWP; or is further configured to: after the receiving unit receives the BWP switching indication information, enable the UE to stop performing the random access procedure on the first BWP and perform the random access procedure on the second BWP.

13. The apparatus according to Embodiment 12, where when performing the random access procedure on the initial BWP, the processing unit is configured to perform the random access procedure on the initial BWP if the initial BWP meets the condition for performing a random access procedure.

The processing unit and/or the receiving unit of the UE may perform determining or detection, to determine whether a BWP meets the condition for performing a random access procedure; or the network device may perform determining or detection, to determine whether a BWP meets the condition for performing a random access procedure; or the network device and the UE may separately perform determining or detection, to determine whether a BWP meets the condition for performing a random access procedure.

14. The apparatus according to Embodiment 12 or 13, where when performing the random access procedure on the second BWP, the processing unit is configured to:

perform the random access procedure on the second BWP if the second BWP meets the condition for performing a random access procedure.

15. The apparatus according to any one of Embodiments 12 to 14, where the meeting the condition for performing a random access procedure includes at least one of the following two: a resource used for random access is available; or a common search space CSS used to receive a random access response RAR is available.

16. The apparatus according to any one of Embodiments 12 to 15, where that the condition for performing a random access procedure is not met includes at least one of the following two: no resource used for random access is configured; or no common search space CSS used to receive a random access response RAR is configured.

17. The apparatus according to any one of Embodiments 12 to 16, where when performing the RA procedure on the first BWP, the processing unit performs at least any one of the following:

skipping deactivating the first BWP;

keeping the first BWP activated;

stopping a bandwidth part inactivity timer used to maintain the first BWP continuing to use a value of a power ramping counter of the user equipment;

continuing to use a backoff parameter of the user equipment;

using a random access priority corresponding to the first BWP, and adjusting at least one of the following based on at least the random access priority corresponding to the first BWP: the backoff (backoff) parameter, a power increment value, the power ramping counter, and a preamble counter (preamble counter);

continuing to use a first transmit beam, where the first beam is a transmit beam used by the UE before or when the UE receives the switching indication information; and switching from the first transmit beam to a second transmit beam, where the second transmit beam is different from the first transmit beam.

18. The apparatus according to any one of Embodiments 12 to 17, where the network device configures a default BWP for the UE, the default BWP includes a default downlink BWP, and the first BWP includes a first downlink BWP; and the first downlink BWP is different from the default downlink BWP.

19. The apparatus according to any one of Embodiments 12 to 18, where when performing the RA procedure on the second BWP, the processing unit performs at least any one of the following:

setting the power ramping counter to an initial value;

setting the backoff parameter to an initial value, or setting the backoff parameter to a value in a backoff indicator;

using a random access priority corresponding to the second BWP, and adjusting at least one of the following based on at least the random access priority corresponding to the second BWP: the backoff backoff parameter, the power increment value, the power ramping counter, and the preamble counter preamble counter;

continuing to use the first transmit beam, where the first beam is a transmit beam used by the UE before or when the UE receives the switching indication information or before the UE switches to the second BWP; and switching from the first transmit beam to the second transmit beam, where the second transmit beam is different from the first transmit beam.

20. The apparatus according to any one of Embodiments 12 to 18, where when performing the RA procedure on the second BWP, the processing unit performs at least any one of the following:

continuing to use the value of the power ramping counter of the user equipment;

continuing to use the backoff parameter of the user equipment;

using a random access priority corresponding to the second BWP, and adjusting at least one of the following based on at least the random access priority corresponding to the second BWP: the backoff backoff parameter, the power increment value, the power ramping counter, and the preamble counter preamble counter;

continuing to use the first transmit beam, where the first beam is a transmit beam used by the UE before or when the UE receives the switching indication information or before the UE switches to the second BWP; and switching from the first transmit beam to the second transmit beam, where the second transmit beam is different from the first transmit beam.

21. The apparatus according to any one of Embodiments 12 to 20, where when performing the RA procedure on the initial BWP, the processing unit performs at least any one of the following:

setting the power ramping counter to the initial value;

setting the backoff parameter to the initial value, or setting the backoff parameter to the value in the backoff indicator;

using a random access priority corresponding to the initial BWP, and adjusting at least one of the following based on at least the random access priority corresponding to the initial BWP: the backoff parameter, the power increment value, the power ramping counter power ramping counter, and the preamble counter preamble counter;

continuing to use the first transmit beam, where the first beam is a transmit beam used by the UE before the UE switches to the initial BWP; and switching from the first transmit beam to the second transmit beam, where the second transmit beam is different from the first transmit beam.

22. The apparatus according to any one of Embodiments 12 to 21, where the first BWP includes a first uplink UL BWP and/or a first downlink BWP, and the second BWP includes a second uplink UL BWP and/or a second downlink BWP;

that the BWP switching indication information is used to instruct the UE to use the second BWP includes that the BWP switching indication information is used to instruct the UE to use the second uplink UL BWP, or the second downlink BWP, or both the second uplink UL BWP and the second downlink BWP; and the BWP switching indication information is further used to instruct the UE to switch the first uplink UL BWP, or used to instruct the UE to switch the first downlink BWP, or used to instruct the UE to switch the first uplink UL BWP and the first downlink BWP.

23. User equipment UE, where the UE includes a transceiver, a processor, and a memory, where the memory is configured to store a computer executable instruction, the UE works on a first bandwidth part BWP, and the first BWP is a currently active BWP;

the processor is configured to: when the UE needs to perform a random access procedure, if the first BWP does not meet a condition for performing a random access procedure, enable the UE to perform the random access procedure on an initial BWP; or if the first BWP meets a condition for performing a random access procedure, enable the UE to perform the random access procedure on the first BWP;

the transceiver is configured to: when the UE performs the random access procedure on the first BWP, receive BWP switching indication information sent by a network device, where the BWP switching indication information is used to instruct the UE to use a second BWP; and the processor is further configured to: after the transceiver receives the BWP switching indication information, enable the UE to continue to perform the random access procedure on the first BWP; or is further configured to: after the transceiver receives the BWP switching indication information, enable the UE to stop performing the random access procedure on the first BWP and perform the random access procedure on the second BWP.

24. The UE according to Embodiment 23, where when performing the random access procedure on the initial BWP, the processor is configured to perform the random access procedure on the initial BWP if the initial BWP meets the condition for performing a random access procedure.

25. The UE according to Embodiment 23 or 24, where when performing the random access procedure on the second BWP, the processor is configured to:

perform the random access procedure on the second BWP if the second BWP meets the condition for performing a random access procedure.

26. The UE according to any one of Embodiments 23 to 25, where the meeting the condition for performing a random access procedure includes at least one of the following two: a resource used for random access is available; or a common search space CSS used to receive a random access response RAR is available.

27. The UE according to any one of Embodiments 23 to 26, where that the condition for performing a random access procedure is not met includes at least one of the following two: no resource used for random access is configured; or no common search space CSS used to receive a random access response RAR is configured.

28. The UE according to any one of Embodiments 23 to 27, where when performing the RA procedure on the first BWP, the processor performs at least any one of the following:

skipping deactivating the first BWP;
keeping the first BWP activated;
stopping a bandwidth part inactivity timer used to maintain the first BWP;
continuing to use a value of a power ramping counter of the user equipment;
continuing to use a backoff parameter of the user equipment;
using a random access priority corresponding to the first BWP, and adjusting at least one of the following based on at least the random access priority corresponding to the first BWP: the backoff parameter, a power increment value, the power ramping counter, and a preamble counter preamble counter;
continuing to use a first transmit beam, where the first beam is a transmit beam used by the UE before or when the UE receives the switching indication information; and
switching from the first transmit beam to a second transmit beam, where the second transmit beam is different from the first transmit beam.

29. The UE according to any one of Embodiments 23 to 28, where the network device configures a default BWP for the UE, the default BWP includes a default downlink BWP, and the first BWP includes a first downlink BWP; and the first downlink BWP is different from the default downlink BWP.

30. The UE according to any one of Embodiments 23 to 29, where when performing the RA procedure on the second BWP, the processor performs at least any one of the following:

setting the power ramping counter to an initial value;
setting the backoff parameter to an initial value, or setting the backoff parameter to a value in a backoff indicator;
using a random access priority corresponding to the second BWP, and adjusting at least one of the following based on at least the random access priority corresponding to the second BWP: the backoff parameter, the power increment value, the power ramping counter, and the preamble counter preamble counter;
continuing to use the first transmit beam, where the first beam is a transmit beam used by the UE before or when the UE receives the switching indication information or before the UE switches to the second BWP; and
switching from the first transmit beam to the second transmit beam, where the second transmit beam is different from the first transmit beam.

31. The UE according to any one of Embodiments 23 to 29, where when performing the RA procedure on the second BWP, the processor performs at least any one of the following:

continuing to use the value of the power ramping counter of the user equipment;
continuing to use the backoff parameter of the user equipment;
using a random access priority corresponding to the second BWP, and adjusting at least one of the following based on at least the random access priority corresponding to the second BWP: the backoff parameter, the power increment value, the power ramping counter, and the preamble counter preamble counter;
continuing to use the first transmit beam, where the first beam is a transmit beam used by the UE before or when the UE receives the switching indication information or before the UE switches to the second BWP; and
switching from the first transmit beam to the second transmit beam, where the second transmit beam is different from the first transmit beam.

32. The UE according to any one of Embodiments 23 to 31, where when performing the RA procedure on the initial BWP, the processor performs at least any one of the following:

setting the power ramping counter to the initial value;
setting the backoff parameter to the initial value, or setting the backoff parameter to the value in the backoff indicator;
using a random access priority corresponding to the initial BWP, and adjusting at least one of the following based on at least the random access priority corresponding to the initial BWP: the backoff parameter, the power increment value, the power ramping counter power ramping counter, and the preamble counter preamble counter;
continuing to use the first transmit beam, where the first beam is a transmit beam used by the UE before the UE switches to the initial BWP; and
switching from the first transmit beam to the second transmit beam, where the second transmit beam is different from the first transmit beam.

33. The UE according to any one of Embodiments 23 to 32, where the first BWP includes a first uplink UL BWP and/or a first downlink BWP, and the second BWP includes a second uplink UL BWP and/or a second downlink BWP;

that the BWP switching indication information is used to instruct the UE to use the second BWP includes that the BWP switching indication information is used to instruct the UE to use the second uplink UL BWP, or the second downlink BWP, or both the second uplink UL BWP and the second downlink BWP; and the BWP switching indication information is further used to instruct the UE to switch the first uplink UL BWP, or used to instruct the UE to switch the first downlink BWP, or used to instruct the UE to switch the first uplink UL BWP and the first downlink BWP.

34. A computer program product, including a computer program, where when the computer program is executed on a computer unit, the computer unit implements the method according to any one of Embodiments 1 to 11.

The computer unit may be UE.

35. A computer program, where when the computer program is executed on a computer unit, the computer unit implements the method according to any one of Embodiments 1 to 11.

The computer unit may be UE.

36. A computer readable storage medium, storing a computer program, where when the computer program is executed on a computer, the computer implements the method according to any one of Embodiments 1 to 11.

The computer may be UE.

37. An apparatus, including a processing module and a communications interface, where the processing module is configured to perform the method according to any one of Embodiments 1 to 11.

38. The apparatus according to Embodiment 37, where the apparatus further includes a storage module (which may be a memory), where the storage module is configured to store an instruction, the processing module (which may be a processor) is configured to execute the instruction stored in the storage, and execution of the instruction stored in the storage module enables the processing module to perform the method according to any one of Embodiments 1 to 11.

39. The apparatus according to Embodiment 37 or 38, where the apparatus is a chip or a chip system.

40. A system, including a network device and user equipment UE, where the UE works on a first bandwidth part BWP, where the first BWP is a currently active BWP;

when the UE needs to perform a random access procedure, the UE performs the random access procedure on an initial BWP if the first BWP does not meet a condition for performing a random access procedure; or the UE performs the random access procedure on the first BWP if the first BWP meets a condition for performing a random access procedure;

when the UE performs the random access procedure on the first BWP, the network device sends BWP switching indication information to the UE, where the BWP switching indication information is used to instruct the UE to use a second BWP; and the UE continues to perform the random access procedure on the first BWP; or the UE stops performing the random access procedure on the first BWP, and the UE performs the random access procedure on the second BWP.

The UE may be the UE according to any one of Embodiments 1 to 33.

41. A terminal, where the terminal is configured to perform the method according to any one of Embodiments 1 to 11. The terminal may be UE.

There is no clear correspondence between numbers of the foregoing embodiments and numbers of the following embodiments, and the numbers are merely used for ease of description in this part.

DESCRIPTION OF EMBODIMENTS

The following clearly and completely describes the technical solutions in the embodiments of this application with reference to the accompanying drawings in the embodiments of this application.

Network elements in the embodiments of this application include a network device and user equipment. The network device is an access device through which the user equipment accesses the mobile communications system in a wireless manner, and may be a NodeB (NodeB), an evolved NodeB (eNodeB), a base station in a 5G mobile communications system, a next generation mobile communications NodeB (next generation NodeB, gNB), a base station in a future mobile communications system, an access node in a Wi-Fi system, or the like. The embodiments of this application do not limit a specific technology used by the network device or a specific device form.

The user equipment (user equipment, UE) may be alternatively referred to as a terminal, terminal equipment (Terminal equipment), a mobile station (mobile station, MS), a mobile terminal (mobile terminal, MT), or the like. The user equipment may be a mobile phone (mobile phone), a tablet computer (pad), a computer with a wireless transceiving function, virtual reality (Virtual Reality, VR) user equipment, augmented reality (Augmented Reality, AR) user equipment, a wireless terminal in industrial control (industrial control), a wireless terminal in self-driving (self-driving), a wireless terminal in a remote medical surgery (remote medical surgery), a wireless terminal in smart grid (smart grid), a wireless terminal in transportation safety (transportation safety), a wireless terminal in a smart city (smart city), a wireless terminal in a smart home (smart home), or the like.

I. Bandwidth Part (Bandwidth Part, BWP)

In a new radio (New Radio, NR) system, the system supports a carrier with a 40 MHz bandwidth. If all UEs need to support a carrier bandwidth of 400 MHz, not only a very high requirement is imposed on a bandwidth capability of UE, but also higher energy consumption is caused to the UE. To reduce the requirement on the bandwidth capability of the UE, and reduce power consumption of the UE, a concept of a BWP is introduced to the NR. The BWP supports UE in performing data transmission and a related operation on a part of a bandwidth of a broad carrier.

Figure 1:
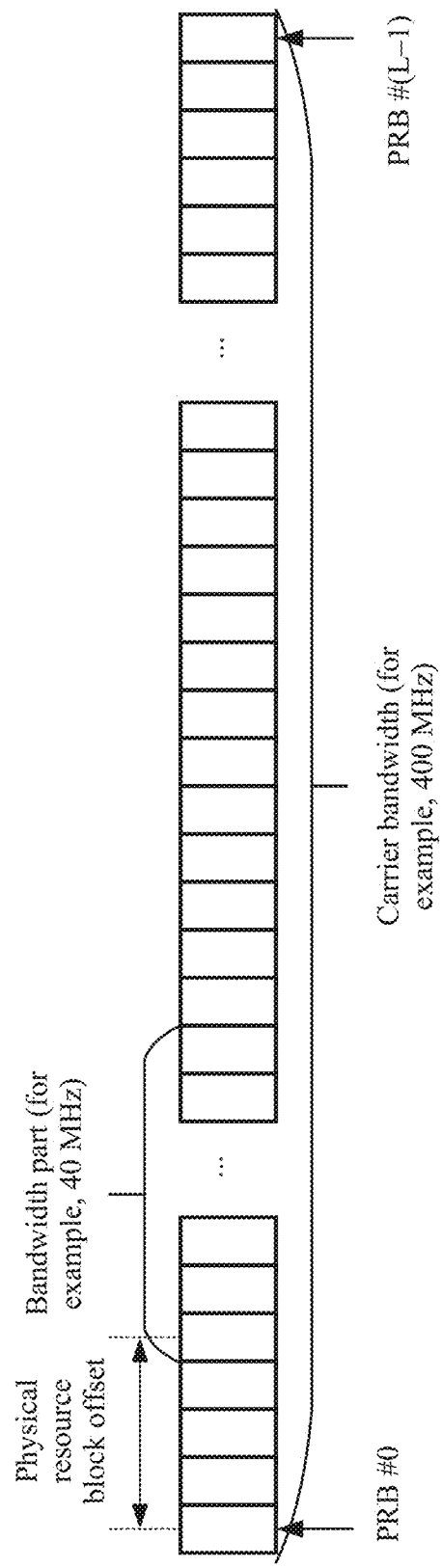
FIG. 1 is a schematic structural diagram of a bandwidth part and a carrier bandwidth according to this application.

As shown in FIG. 1, a bandwidth part includes N physical resource blocks (physical resource block, PRB), and each physical resource block includes K sub-carriers (sub-carrier), where N is an integer greater than or equal to 1 (for example, N=2), and K is an integer greater than or equal to 1 (for example, K=12). The N physical resource blocks may be continuous or discontinuous. A carrier bandwidth (carrier bandwidth) in FIG. 1 may be a frequency domain bandwidth provided by a carrier (carrier) working in a 4G or 5G mobile communications system, and includes L PRBs, where L is an integer greater than or equal to 1, and L is greater than or equal to N.

A network device may allocate at least one bandwidth part to user equipment served by the network device. Considering frequency-selective fading (frequency-selective fading), bandwidth parts in different locations of a carrier bandwidth may have different fading characteristics. For user equipment, a network device serving the user equipment may allocate, as far as possible, a bandwidth part having a good channel condition to the user equipment.

Figure 2:
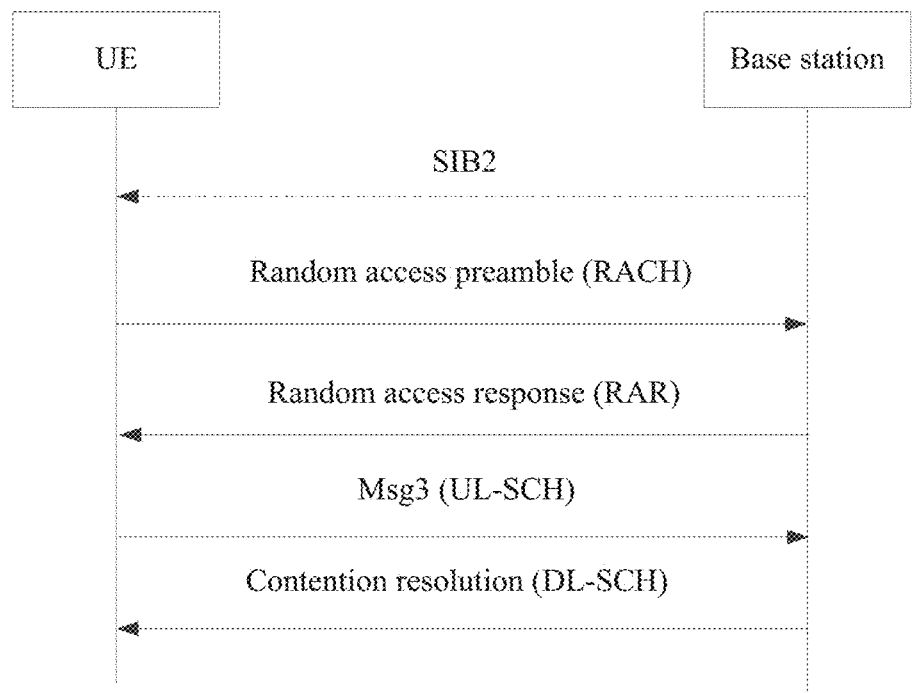
FIG. 2 is a schematic diagram of a contention-based random access procedure in LTE.

When a bandwidth of a cell is very high, a user may work on only a part of the bandwidth of the cell. Each bandwidth part of the cell is referred to as a BWP, as shown in FIG. 2. Each BWP correspondingly supports one physical layer parameter, which may be referred to as numerology (Numerology). The numerology includes subcarrier spacing configuration and cyclic prefix length configuration. Different BWPs may support same numerology or different numerology.

A BWP may be understood as a frequency band having a different width. This application uses a BWP as an example name, and does not limit another name, for example, a channel, a frequency channel, a frequency bandwidth, a frequency band, or frequency domain.

In this application, in a possible design, configuration information of each bandwidth part includes at least a physical resource block offset (PRB offset), the quantity of physical resource blocks (number of PRBs), and a subcarrier spacing (subcarrier spacing).

The physical resource block offset may be an offset of a first physical resource block included in a bandwidth part relative to a first physical resource block included in an entire carrier bandwidth, as shown in FIG. 1. In addition, the configuration information of each bandwidth part may further include at least one of the following parameters: a cyclic prefix length (cyclic prefix length), a transmission time interval (transmission time interval, TTI), a center frequency (center frequency), and a frequency location (frequency location).

In addition, in another possible design, the configuration information of each bandwidth part includes at least an index of the bandwidth part. The index of each bandwidth part may indicate the configuration information of the corresponding bandwidth part. Configuration information of a bandwidth part may include a plurality of parameters, for example, a physical resource block offset, the quantity of physical resource blocks, and a subcarrier spacing. Further, configuration information of a bandwidth part corresponding to each index may further include at least one of the following parameters: a cyclic prefix length, a transmission time interval, a center frequency, and a frequency location.

In this application, an initial bandwidth part (initial BWP) may be used as a bandwidth part used in a process in which user equipment establishes a connection to a network device. The initial BWP is indicated by the network device in system information. Further, the initial BWP is configured under a limitation of a capability of a UE device. A default bandwidth part (default BWP) may be used as a bandwidth part used after the user equipment wakes up from a dormant process, or may be a bandwidth part used after the user equipment is out of uplink synchronization, or may be a bandwidth part used when the user equipment initiates random access. The default bandwidth part may be the same as the initial bandwidth part.

The following conclusions have been reached in a progress of an existing NR standard:

In Rel-15, a serving cell of UE has a maximum of one active downlink (DownLink, DL) BWP and a maximum of one active uplink (UpLink, UL) BWP.

In an FDD (frequency division duplex, frequency division duplex) scenario, a DL BWP and a UL BWP in each serving cell of UE are separately configured. In a TDD scenario, a DL BWP and a UL BWP in each serving cell of UE are jointly configured as a bandwidth part pair (BWP pair); and the DL BWP and the UL BWP have a same center frequency, but may have different bandwidths.

It should be noted that the BWP pair may be alternatively referred to as a BWP, and the BWP includes an uplink BWP and a downlink BWP. The BWP pair may be directly replaced with the BWP, and details are not described in this application.

In the NR, the following two manners are supported during switching of an active BWP (active BWP):

(1) Manner based on scheduling downlink control information (Downlink Control Information, DCI): For the scheduling DCI manner, in the FDD scenario, DL-specific scheduling DCI is used to switch a DL active BWP, and UL-specific scheduling DCI is used to switch a UL active BWP; in the TDD scenario, one piece of scheduling DCI is used to switch from an active BWP pair to another active BWP pair.

(2) Dedicated timer, for example, a bandwidth part inactivity timer (BWP inactivity timer): For the manner based on the dedicated timer, in the FDD scenario, if the timer expires, the UE switches from a currently active DL BWP to a default DL BWP; in the TDD scenario, if the timer expires, the UE switches from a currently active BWP pair to a default BWP pair.

In a primary cell (primary cell, PCell), for UE, in the NR, a common search space (Common Search Space, CSS) used for an RA procedure may be configured in each BWP.

When performing an RA procedure on a BWP pair, the UE first needs to send a preamble preamble on a UL BWP, and listens to RAR DCI in a CSS in the DL BWP. The UE can perform the RA procedure on an active BWP pair only when a corresponding UL BWP has a PRACH resource, and a corresponding DL BWP has a CSS used for the RA procedure, that is, a CSS used to receive an RAR.

II. Random Access (Random Access) Procedure

In a conventional long term evolution (4th Generation, LTE) mobile communications system, that user equipment initially accesses a system mainly includes three important steps: (1) an initial synchronization and cell search process; (2) a network sends basic system information; and (3) a random access process. A detailed process is shown in FIG. 2. In step (1), the user equipment may obtain preliminary downlink time synchronization and preliminary frequency synchronization based on a primary synchronization signal (Primary Synchronization Signal, PSS) and a secondary synchronization signal (Secondary Synchronization Signal, SSS), obtain symbol synchronization and frame synchronization, and obtain information such as a cyclic prefix and a cell ID. In step (2), a system sends a basic system message, namely, a system information block (system information block, SIB) message, and the user equipment receives the basic system message (the SIB message), reads the basic system information, to obtain a network configuration message of uplink random access, and provides related information for the random access procedure in the third step. In step (3), the user equipment obtains resource configuration information of uplink random access based on the basic system information provided by the system, and performs an uplink random access procedure. According to a conclusion reached in the 3GPP standard, in the uplink random access procedure, a contention-based random access procedure still uses a method similar to sending four messages in a conventional LTE system. To be specific, the user equipment sends a preamble (preamble), the network device feeds back a random access response (Random Access Response, RAR), the user equipment sends a message-3 message, and the network device replies with a message-4 message to perform contention resolution, so as to complete a final uplink random access procedure.

An existing contention-based random access manner is shown in FIG. 2. First, UE sends a random access preamble (random access preamble) to an eNB, notifies the eNodeB (eNB for short) of a random access request, and enables the eNB to estimate a transmission delay between the eNB and the UE and calibrate uplink timing (timing advance, TA) according to the transmission delay. After sending the preamble, the UE listens on a PDCCH within a time window of a random access feedback, to receive an RAR message replied with by the eNB. Because a resource of the preamble may be used by a plurality of UEs, to distinguish between different UEs, subsequently, each UE sends a third message in an RA procedure, where the information includes a unique identity of the UE. In other words, the UEs have different unique identities. In the final step, the eNB replies with a unique identity of UE in the third message in the RA procedure, to notify which UE or UEs succeeds or succeed in channel contention.

III. Mapping Between a Logical Channel and Numerology/Transmission Time Length in an NR System In the NR system, user equipment may have a plurality of services at the same time. Services having a same QoS requirement may be mapped to a same data radio bearer for transmission. Services having different QoS requirements need to be mapped to different data radio bearers for transmission.

During transmission, each of the services having different QoS requirements needs to be transmitted by using an uplink grant (UL grant) that corresponds to numerology (specifically including a subcarrier spacing (subcarrier spacing) and a cyclic prefix (cyclic prefix) length) and a transmission time length that can support a corresponding QoS requirement.

To ensure that a data packet on a data radio bearer can be transmitted by using a UL grant of numerology and a transmission time length that match a QoS requirement of the data packet, a base station configures a mapping relationship between a logical channel corresponding to a data radio bearer and numerology/transmission time length for the user equipment. After the UE receives a UL grant allocated by the base station, if numerology/transmission time length that is used for data transmission and that is indicated in the UL grant matches a logical channel, the user equipment can transmit data of the logical channel by using the UL grant. Otherwise, the data of the logical channel cannot be transmitted by using the UL grant.

User equipment may support data transmission on one carrier by using UL grants of a plurality of numerology/transmission time lengths, or may support, if carrier aggregation is configured, data transmission on different carriers by using UL grants of a plurality of numerology/transmission time lengths.

One logical channel of user equipment may be configured to be associated with one or more SRs (Scheduling Request, scheduling request).

The base station may learn, based on SR configuration corresponding to an SR signal sent by the UE and an association relationship between SR configuration and a logical channel, a UL grant that corresponds to a specific numerology/transmission time length combination and that is required by the UE to transmit data.

To meet a requirement of a wireless data communication traffic that increases due to deployment of the 4G communications system, 3GPP has started to improve or extend the 4G communications system. Therefore, a 5G or pre-5G communications system is also referred to as a "super 4G network", a "post LTE (Long Term Evolution, long term evolution) system", or an NR. In the 3GPP, the 5G communications system is considered to be implemented at approximately 4 GHz such as 3300 MHz to 4990 MHz, at approximately 30 GHz such as 24.25 GHz to 52.6 GHz, and at approximately 70 GHz such as 66 GHz to 86 GHz. Working frequency bands of approximately 30 GHz and approximately 70 GHz are collectively referred to as a high frequency (High frequency, HF), and a higher data rate can be implemented. To reduce a radio propagation loss and increase a transmission distance, antenna technologies such as beamforming, massive multiple input multiple output (MIMO), full-dimension MIMO (FD-MIMO, Full-Dimension MIMO), an array antenna, digital beamforming (Digital Beamforming), and analog beamforming (Analog Beamforming) have been discussed in the 5G communications system.

A network device such as a gNB, a TRxP (also referred to as a TRP), or a cell in the 5G communications system may interact with user equipment such as UE by using a beamforming (Beamforming) technology. The network device may usually form a plurality of downlink transmit beams ((down link DL) Tx Beam), where the Tx beam is a transmit beam, a transmission beam, or a transmitting beam, and send a downlink signal to UE in coverage of one or more DL Tx beams on the DL Tx beam or the DL Tx beams. The UE may perform receiving by using a receive beam Rx beam or an omnidirectional antenna, where the Rx beam is a receive beam or a receiving beam, to obtain a higher array gain. A higher data transmission rate is implemented between the network device and the user equipment by using the beamforming technology.

Figure 3:
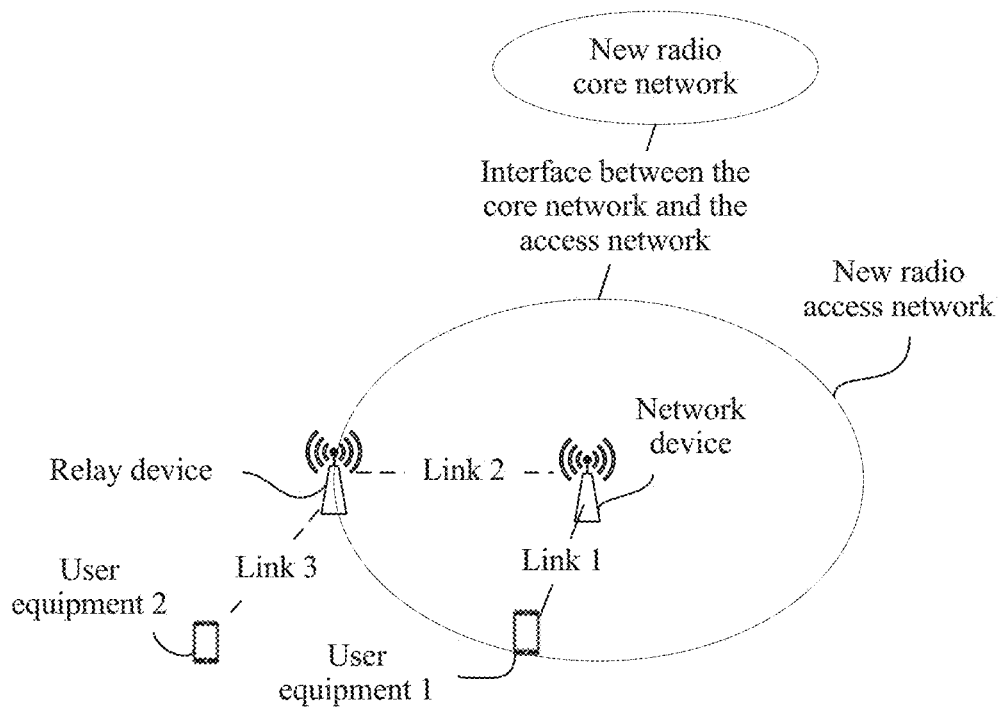
FIG. 3 is a schematic diagram of a communications system to which this application is applicable.

This application may be applied to a wireless communications system shown in FIG. 3, including a scenario such as an NR scenario, an LTE next generation scenario, a WLAN scenario, or a Bluetooth communication scenario. For ease of description, the embodiments of this application are described by using the NR scenario as an example. As shown in FIG. 3, the NR scenario may include a new radio core network such as (New Radio new radio access technology core, NR_newRAT-Core), and a new radio access network. Function entities in the NR scenario mainly include a network device and user equipment that is connected to the network device in the new radio access network, for example, user equipment 1 in FIG. 3, and may further include a relay device and user equipment that is connected to a relay, for example, user equipment 2 in FIG. 3. The relay device is connected to the network device by using a link 2, and therefore, for the network device, the relay device may be alternatively considered as user equipment. The relay device is connected to the user equipment 2 by using a link 3, and therefore, for the user equipment, the relay device may be alternatively considered as a network device. Therefore, it should be understood that the network device in this application may further include a relay device, and the user equipment in this application may further include a relay device. The network device may be specifically any one of or a combination of several of a gNB, a new radio eNodeB (New radio eNB), a transmission and reception point (transmission and reception point, TRP), a macro base station, a micro base station, a high frequency base station, an LTE macro or micro eNB, CPE, a WLAN AP, a WLAN group owner (group owner, GO), and the like. For example, the network device may be a gNB, and the gNB implements functions of the network device in the present invention, or the network device is a combination of a gNB and a TRP, for example, the gNB implements a resource configuration function of the network device in this application, and the TRP implements sending and receiving functions of the network device in the present invention. This application is not limited thereto. The user equipment may be a mobile phone, a tablet computer, an intelligent vehicle, a sensing device, an IOT device, wireless customer-premises equipment (Customer-Premises Equipment, CPE), a relay base station, or the like.

Figure 4:
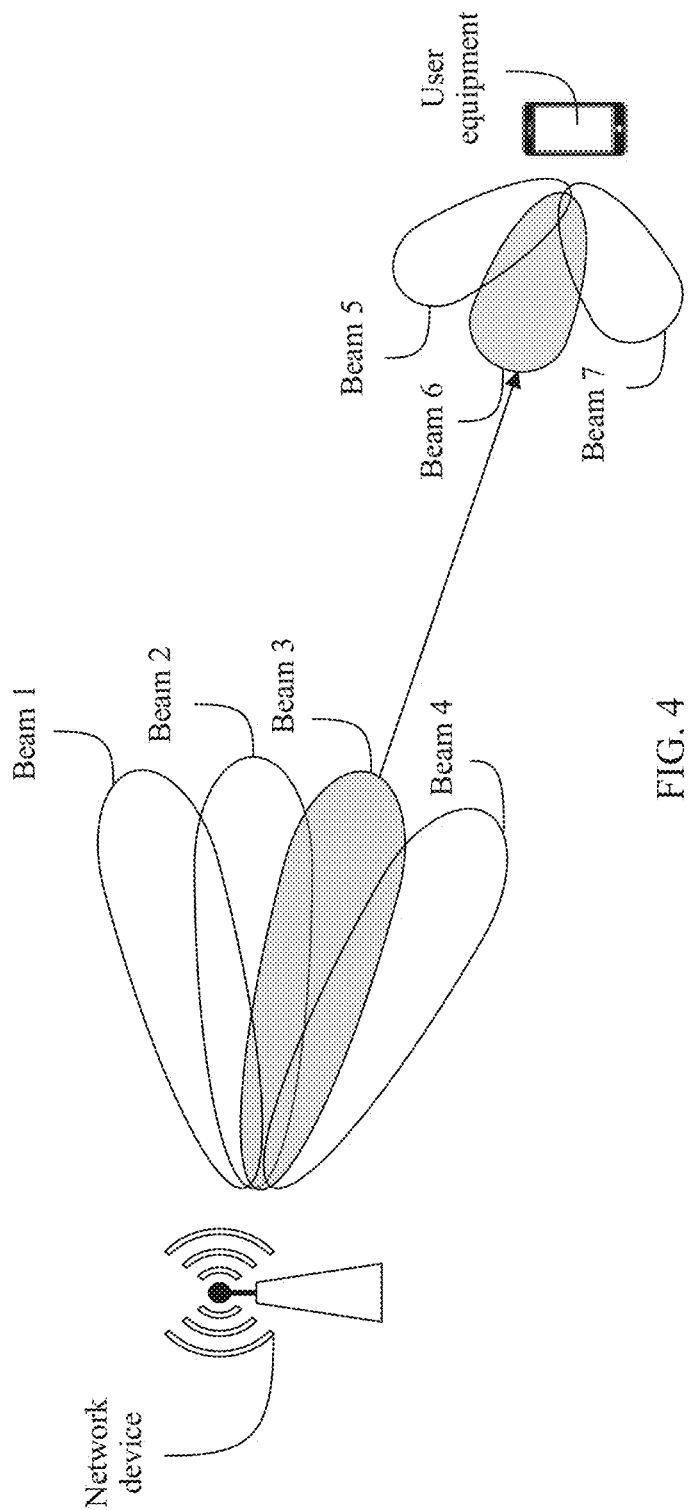
FIG. 4 is a schematic diagram of connection between a network device and user equipment.

As shown in FIG. 4, a network device may form a plurality of transmit beams or receive beams by using the beamforming technology, for example, digital beamforming (Digital Beamforming) or analog beamforming (Analog Beamforming). The beams may have a same coverage angle or different coverage angles, and beams having different coverage angles may overlap. For example, the network device may send control information by using a beam having a relatively wide coverage angle, and send data information by using a beam having a relatively narrow coverage angle. The user equipment may receive, within coverage of one or more beams, a beam cluster, or a beam group, information sent by the network device.

The user equipment may also form a plurality of receive beams by using the beamforming technology, and determine to use one or more receive beams to perform receiving in correspondence to a downlink beam used by the network device. For ease of description, a beam in the embodiments of the present invention may be a single beam or a plurality of beams.

Therefore, a downlink transmit beam of the network device and a corresponding receive beam of the user equipment, or an uplink transmit beam of the user equipment and a corresponding receive beam of the network device may be referred to as a beam pair beam pair. A transmission link formed by the beam pair is referred to as a beam pair link (Beam Pair Link, BPL). For example, when the network device in FIG. 4 uses a beam 3 as a downlink transmit beam, the user equipment may determine to use a beam 6 as a corresponding receive beam, and the beam 3 and the beam 6 form a BPL. When a beam of the network device or the user equipment meets a beam correspondence (Beam Correspondence) feature, a corresponding receive beam or transmit beam may be determined based on a transmit beam or a receive beam.

In this application, a beam may be alternatively referred to as a beam, a beam may be directly replaced with a beam, or a beam may be directly replaced with a beam. Details are not described in this application.

Optionally, a beam may be alternatively referred to as a direction, and a beam may be directly replaced with a direction, or a direction may be directly replaced with a beam. For example, a first beam may be replaced with a first direction, or a first direction may be replaced with a first beam. Details are not described in this application.

Optionally, a beam may be alternatively referred to as a spatial resource, and a beam may be directly replaced with a spatial resource, or a spatial resource may be directly replaced with a beam. Details are not described in this application.

Optionally, a beam may be alternatively referred to as a precoding vector, and a beam may be directly replaced with a precoding vector, or a precoding vector may be directly replaced with a beam. Details are not described in this application.

A network device may be alternatively referred to as a gNB, and a network device may be directly replaced with a gNB, or a gNB may be directly replaced with a network device. Details are not described in this application.

Optionally, a network device may be alternatively referred to as a TRP, and a network device may be directly replaced with a TRP, or a TRP may be directly replaced with a network device. Details are not described in this application.

Optionally, identity information of a beam may be alternatively referred to as index information of the beam, and the identity information of the beam may be directly replaced with the index information of the beam, or the index information of the beam may be directly replaced with the identity information of the beam. Details are not described in this application.

The identity information of the beam may be alternatively referred to as beam identity information, and the identity information of the beam may be directly replaced with the beam identity information, or the beam identity information may be directly replaced with the identity information of the beam. Details are not described in this application.

Optionally, a beam/beam may be understood as a spatial resource, and may be a sending or receiving precoding vector having energy transmission directivity/direction. In addition, the sending or receiving precoding vector can be identified by using index information. The energy transmission directivity may mean that a signal precoded by using the precoding vector has a relatively good receiving power when the signal is received in a particular spatial location, for example, a receiving demodulation signal to noise ratio is met. The energy transmission directivity may alternatively mean that a plurality of same signals sent in different spatial locations has different receiving powers when the signals are received by using the precoding vector. That a device uses different beams may be understood as that the device uses different spatial resources. Optionally, an uplink spatial resource and/or a downlink spatial resource, or a spatial resource used to send information and a spatial resource used to receive information are further distinguished.

Optionally, a beam may be understood as a main lobe formed by using a sending mode of an antenna array, for example, the beam (of the antenna) is the main lobe of the radiation pattern of an antenna array.

Optionally, one communications device (for example, a terminal device or a network device) may have different precoding vectors. Different devices may also have different precoding vectors, that is, correspond to different beams. Different beams may correspond to different directions. That a device uses different beams may be understood as that a device uses different precoding vectors. Optionally, an uplink precoding vector and a downlink precoding vector, or a precoding vector used to send information and a precoding vector used to receive information are further distinguished.

Optionally, a bean/beam may be further understood as a spatial domain transmission filter (spatial domain transmission filter). That a device (for example, a network device and/or user equipment) uses a beam may be replaced with that a device uses a spatial domain transmission filter.

Optionally, for configuration or a capability of a communications device, the communications device may use one or more of a plurality of different precoding vectors at a same moment, that is, may form one or more beams at the same time. Information about the beam may be identified by using index information. Optionally, the index information may correspond to an identity (identity, ID) of a resource configured for the UE. For example, the index information may correspond to an ID or a resource of a configured channel state information reference signal (Channel status information Reference Signal, CSI-RS), or may correspond to an ID or a resource of a configured uplink sounding reference signal (Sounding Reference Signal, SRS). Alternatively, optionally, the index information may be a signal carried by using a beam or index information explicitly or implicitly carried on a channel. For example, the index information may be a synchronization signal sent by using a beam or the index information of the beam may be indicated by using a broadcast channel.

A beam pair may include a transmit beam of a transmit end and a receive beam of a receive end, alternatively referred to as an uplink beam or a downlink beam. For example, a beam pair may include a gNB Tx beam transmit beam or a UE Rx beam receive beam, or a UE Tx beam transmit beam or a gNB Rx beam receive beam. The transmit beam may be alternatively understood as a transmit beam.

Optionally, the identity information of the beam may be specifically one or more of an ID of the beam, an ID generated based on the ID of the beam, a name of the beam, an index of the beam, an index generated based on the index of the beam, a derivative value of the ID of the beam, a derivative value of the name of the beam, a derivative value of the index of the beam, a hash value of the ID of the beam, a hash value of the name of the beam, a hash value of the index of the beam, a truncated value of the ID of the beam, a truncated value of the name of the beam, a truncated value of the index of the beam, a hash value of the ID of the beam plus plaintext information, a hash value of the name of the beam plus plaintext information, a hash value of the index of the beam plus plaintext information, a map of the ID of the beam, a map of the name of the beam, a map of the index of the beam, and a map of the beam.

A beam (for example, an $N^{th}$ beam, where N is any beam supported by a device) used by the device is not limited. For ease of understanding, an example in which the device uses a first beam is used.

Optionally, for example, that the device uses the first beam may be replaced with that the device is in a first direction. Further, that the device uses a first transmit beam may be replaced with that the device is in a first sending direction, and/or that the device uses a first receive beam may be replaced with that the device is in a first receiving direction.

Optionally, for example, that the device uses a first beam (or is in a first direction) may be replaced with that the device uses a first spatial resource. Further, that the device uses a first transmit beam may be replaced with that the device uses a first sending spatial resource, and/or that the device uses a first receive beam may be replaced with that the device uses a first receiving spatial resource.

Optionally, for example, that the device uses a first beam (or is in a first direction) may be replaced with that the device uses a first antenna mode. Further, that the device uses a first transmit beam may be replaced with that the device uses a first sending antenna mode, and/or that the device uses a first receive beam may be replaced with that the device uses a first receiving antenna mode.

Optionally, for example, that the device uses a first beam (or is in a first direction) may be replaced with that the device uses a first antenna mode. Further, that the device uses a first transmit beam may be replaced with that the device uses a first sending antenna mode, and/or that the device uses a first receive beam may be replaced with that the device uses a first receiving antenna mode.

Optionally, for example, that the device uses a first beam (or is in a first direction) may be replaced with that the device uses a first antenna array mode. Further, that the device uses a first transmit beam may be replaced with that the device uses a first transmit antenna array mode, and/or that the device uses a first receive beam may be replaced with that the device uses a first receive antenna array mode.

Optionally, for example, that the device uses a first beam (or is in a first direction) may be replaced with that the device uses a first spatial domain transmission filter. Further, that the device uses a first transmit beam may be replaced with that the device uses a first spatial domain transmission filter used for sending, and/or that the device uses a first receive beam may be replaced with that the device uses a first spatial domain transmission filter used for receiving.

Optionally, for example, that the device uses a first transmit beam (or is in a first direction) may be replaced with that the device uses a first sending spatial domain transmission filter, and/or that the device uses a first receive beam may be replaced with that the device uses a first receiving spatial domain transmission filter.

Optionally, for example, that the device uses a first beam (or is in a first direction) may be replaced with that the device uses a first precoding vector. Further, that the device uses a first transmit beam may be replaced with that the device uses a first sending precoding vector, and/or that the device uses a first receive beam may be replaced with that the device uses a first receiving precoding vector.

Optionally, for example, that the device uses a first beam (or is in a first direction) may be replaced with that the device uses a first weight. Further, that the device uses a first transmit beam may be replaced with that the device uses a first sending weight, and/or that the device uses a first receive beam may be replaced with that the device uses a first receiving weight.

Optionally, for example, that the device uses a first beam (or is in a first direction) may be replaced with that the device uses a first parameter (for example, a parameter in an antenna array). Further, that the device uses a first transmit beam may be replaced with that the device uses a first sending parameter, and/or that the device uses a first receive beam may be replaced with that the device uses a first receiving parameter.

Optionally, for example, that the device uses a first beam (or is in a first direction) may be replaced with that the device uses a first weighting parameter (for example, different antennas in an antenna array use different parameters). Further, that the device uses a first transmit beam may be replaced with that the device uses a first sending weighting parameter, and/or that the device uses a first receive beam may be replaced with that the device uses a first receiving weighting parameter.

Optionally, for example, that the device uses a first beam (or is in a first direction) may be replaced with that the device uses first beamforming. Further, that the device uses a first transmit beam may be replaced with that the device uses first transmit beamforming, and/or that the device uses a first receive beam may be replaced with that the device uses first receive beamforming.

Optionally, a transmit beam (or referred to as a downlink beam) used by the network device corresponds to a channel state information reference signal resource indicator (CSI-RS Channel State Information Reference Signal resource indicator, CRI). For example, a first transmit beam (or a first direction) corresponds to a first CRI, and a second transmit beam (or a second direction) corresponds to a second CRI. Optionally, that the network device sends information on a first channel state information reference signal resource means that the network device uses the first transmit beam. Optionally, that the user equipment indicates a CRI of the network device means that the UE indicates a transmit beam of the network device. For example, optionally, that the UE indicates the first CRI of the network device means that the UE indicates the first transmit beam of the network device.

Optionally, a transmit beam (or referred to as a downlink beam) used by the network device corresponds to a synchronization signal block resource indicator (SSB synchronization signals block resource indicator, SBRI). For example, a first transmit beam (or a first direction) corresponds to a first SBRI, and a second transmit beam (or a second direction) corresponds to a second SBCRI. Optionally, that the network device sends information on a first synchronization signal block resource means that the network device uses the first transmit beam. Optionally, that the UE indicates an SBRI of the network device means that the UE indicates a transmit beam of the network device. For example, optionally, that the UE indicates the first SBRI of the network device means that the UE indicates the first transmit beam of the network device.

Optionally, a transmit beam (or referred to as a downlink beam) used by the network device corresponds to a synchronization signal block (synchronization signals block index, SSB) index (index). For example, a first transmit beam (or a first direction) corresponds to a first SSB index, and a second transmit beam (or a second direction) corresponds to a second SSB index.

Optionally, that the network device sends information on a resource corresponding to a first SSB means that the network device uses a first transmit beam. Optionally, that the UE indicates an SSB index of the network device means that the UE indicates a transmit beam of the network device. For example, optionally, that the UE indicates the first SSB index of the network device means that the UE indicates the first transmit beam of the network device.

Optionally, a transmit beam (or referred to as a downlink beam) used by the network device corresponds to an SSB time index (SSB, synchronization signals block time index, synchronization signal block time index). For example, a first transmit beam (or a first direction) corresponds to a first SSB time index, and a second transmit beam (or a second direction) corresponds to a second SSB time index. Optionally, that the network device sends information on a resource corresponding to a first SSB time means that the network device uses the first transmit beam. Optionally, the UE indicates an SSB time index of the network device means that the UE indicates a transmit beam of the network device. For example, optionally, that the UE indicates the first SSB time index of the network device means that the UE indicates the first transmit beam of the network device.

In this application, that the user equipment sends information to the network device may be alternatively referred to as that the user equipment sends information to the network device, and that the user equipment sends information to the network device may be replaced with that the user equipment sends information to the network device. This is not limited in this application.

How UE uses a BWP when the UE needs to perform a random access procedure is a problem that needs to be resolved in this application.

In this application, a BWP switching process may be a process of switching, by the UE, from a source BWP (which may be referred to as a first BWP) to another target BWP (which may be referred to as a second BWP or an initial BWP). This switching is switching between BWPs. To be specific, the source BWP and the target BWP may be controlled by a same network device, or may be controlled by different network devices.

The following describes the embodiments of this application with reference to the accompanying drawings.

Figure 5:
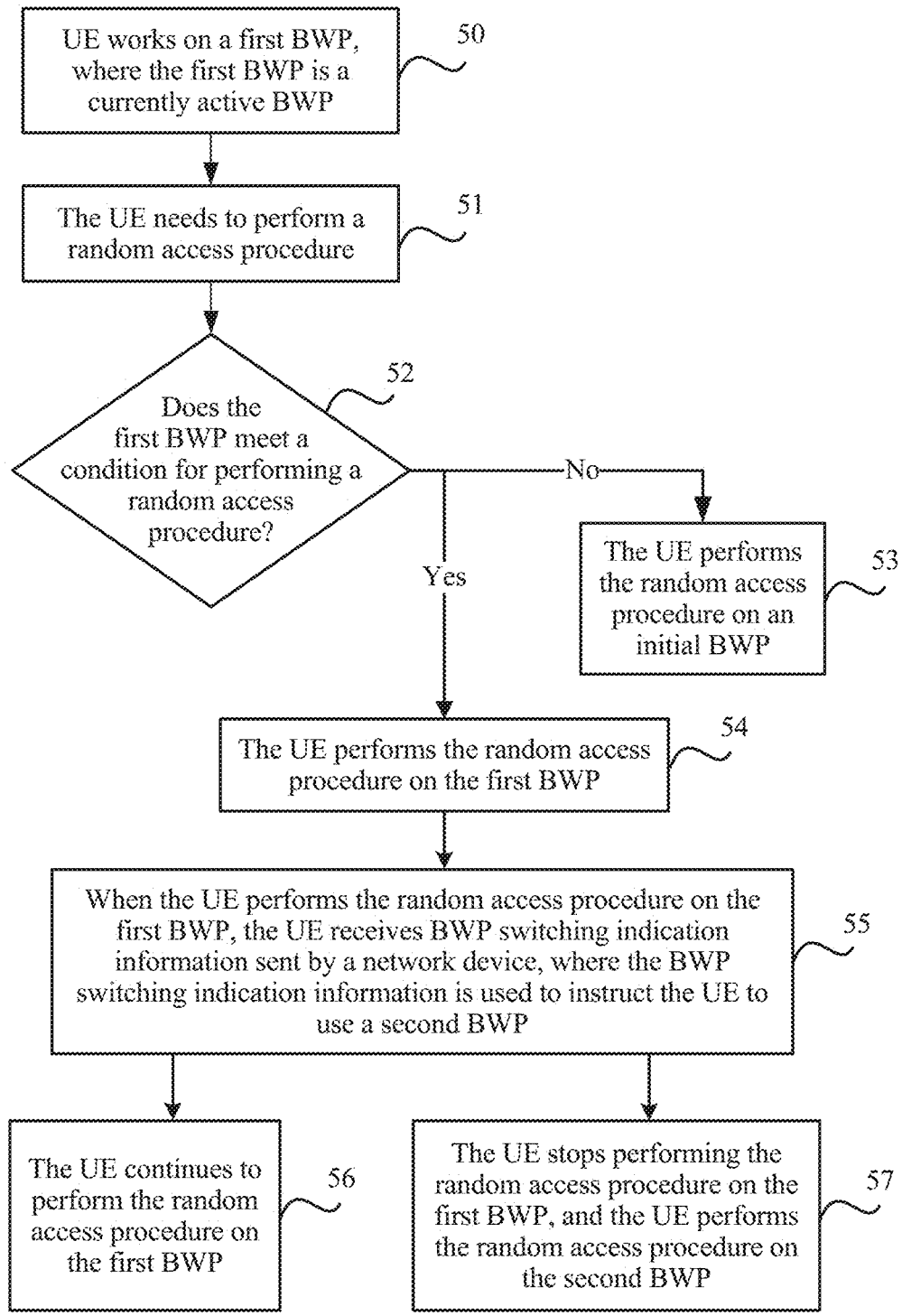
FIG. 5 is a schematic flowchart of a random access method according to this application.

As shown in FIG. 5, this application provides a random access method. The method includes the following steps.

Step 50: UE works on a first BWP, where the first BWP is a currently active BWP.

Step 51: The UE needs to perform a random access procedure.

A case in which the UE needs to perform the random access procedure optionally includes at least one of the following cases: A network device instructs the UE to perform RA, or the UE needs to perform the random access procedure when a counter (counter) corresponding to scheduling request configuration (SR configuration) of the UE reaches a largest value, or the UE is out of synchronization, or radio link interruption (radio link failure) occurs in the UE, or the UE needs to establish a radio resource control (RRC) connection to a gNB.

Step 52: Determine whether the first BWP meets a condition for performing a random access procedure.

Step 53: The UE performs the random access procedure on an initial BWP if the first BWP does not meet the condition for performing a random access procedure.

The performing, by the UE, the random access procedure on an initial BWP includes: performing, by the UE, the random access procedure on the initial BWP when the initial BWP meets the condition for performing a random access procedure.

Specifically, the performing, by the UE, the RA procedure on an initial BWP includes at least any one of the following:

setting, by the UE, a power ramping counter to an initial value; setting, by the UE, the backoff parameter to an initial value, or setting the backoff parameter to a value indicated in a backoff indicator: using, by the UE, an RA priority corresponding to the initial BWP, and adjusting, based on at least the RA priority corresponding to the initial BWP, at least one of the backoff parameter, a power increment value, the power ramping counter (power ramping counter), and a preamble counter preamble counter (preamble counter) preamble counter; continuing, by the UE, to use a first transmit beam, where the first beam is a transmit beam used by the UE before the UE switches to the initial BWP; and switching, by the UE, from the first transmit beam to a second transmit beam, where the second transmit beam is different from the first transmit beam.

According to the method provided in this application, the UE switches to the initial BWP when the initial BWP meets the condition for performing a random access procedure, to quickly implement the random access procedure.

Step 54: The UE performs the random access procedure on the first BWP if the first BWP meets the condition for performing a random access procedure.

The performing, by the UE, the random access procedure on the first BWP includes at least any one of the following: skipping, by the UE, deactivating the first BWP; keeping, by the UE, the first BWP activated; stopping, by the UE, a bandwidth part inactivity timer used to maintain the first BWP; continuing to use a value of the power ramping counter of the user equipment: continuing to use the backoff parameter of the user equipment: using, by the UE, a random access priority corresponding to the first BWP, and adjusting, based on at least the random access priority corresponding to the first BWP, at least one of the backoff parameter, the power increment value, the power ramping counter (power ramping counter), and the preamble counter preamble counter (preamble counter) preamble counter: continuing, by the UE, to use the first transmit beam, where the first beam is a transmit beam used by the UE before or when the UE receives switching indication information and switching, by the UE, from the first transmit beam to the second transmit beam, where the second transmit beam is different from the first transmit beam.

According to the method, a parameter setting of the UE is specified when the UE performs a random procedure on the first BWP. Specifically, the bandwidth part inactivity timer used to maintain the first BWP is stopped, to prevent uncertainty of whether the UE switches a BWP due to triggering of the bandwidth part inactivity timer in the random access procedure, and better implement interworking. The first BWP maintains in an active state, to ensure consistency with a state machine of the UE, and prevent a case in which UE in different states performs different actions. The parameters, for example, the value of the power ramping counter and the backoff parameter, used by the UE when the random access procedure continues to be performed on the first BWP continue to be used, so that inappropriate impact caused to a system by a change of the parameter of the UE can be prevented, interference caused to a network can be avoided, and unfair contention can be avoided. The UE continues to use the first transmit beam, so that the random access procedure of the UE can be accelerated, and the UE implements standardization of the random access procedure, to reduce impact caused by the UE to the network.

Step 55: When the UE performs the random access procedure on the first BWP, the UE receives BWP switching indication information sent by a network device, where the BWP switching indication information is used to instruct the UE to use a second BWP.

After step 55, the UE may choose to perform one of step 56 and step 57.

It should be noted that in this application, the first BWP includes a first uplink BWP and/or a first downlink BWP, and the second BWP includes a second uplink BWP and/or a second downlink BWP.

That the BWP switching indication information is used to instruct the UE to use the second BWP includes that the BWP switching indication information is used to instruct the UE to use the second uplink BWP, or the BWP switching indication information is used to instruct the UE to use the second downlink BWP, or the BWP switching indication information is used to instruct the UE to use the second uplink BWP and the second downlink BWP. The BWP switching indication information is further used to instruct the UE to switch the first uplink BWP, or the BWP switching indication information is further used to instruct the UE to switch the first downlink BWP, or the BWP switching indication information is further used to instruct the UE to switch the first uplink BWP and the first downlink BWP.

Step 56: The UE continues to perform the random access procedure on the first BWP.

Step 57: The UE stops performing the random access procedure on the first BWP, and the UE performs the random access procedure on the second BWP.

The UE performs the random access procedure on the second BWP when the second BWP meets the condition for performing a random access procedure.

In this application, meeting the condition for performing a random access procedure includes at least one of the following two: A resource used for random access is available, or a CSS used to receive a random access response RAR is available.

According to the method, if a resource used for random access is available in a BWP, it may be determined that the BWP meets the condition for performing a random access procedure, so that the UE sends uplink information on the determined BWP. If a CSS used to receive an RAR is available in a BWP, it may be determined that the BWP meets the condition for performing a random access procedure, so that the UE receives downlink information on the determined BWP. Therefore, the UE quickly implements the random access procedure.

That the condition for performing a random access procedure is not met includes at least one of the following two: no resource used for random access is configured, or no CSS used to receive a random access response RAR is configured.

According to the method, if the resource used for random access is not available in a BWP, the UE quickly determines that the random access procedure cannot be initiated on the BWP, or if the CSS used to receive an RAR is not available in a BWP, the UE quickly determines that downlink information cannot be received on the BWP, so that the UE selects a BWP meeting the condition for performing a random access procedure, to implement the random access procedure.

Further, the network device configures a default BWP for the UE. The default BWP includes a default downlink BWP. The first BWP includes the first downlink BWP. The first downlink BWP is different from the default downlink BWP.

The first BWP is different from the default BWP, to distinguish an object specific to the bandwidth part inactivity timer, and prevent the bandwidth part inactivity timer from being blindly started and/or stopped.

In step 57, in a possible design, the performing, by the UE, the RA procedure on the second BWP includes at least any one of the following:

setting, by the UE, the power ramping counter to the initial value: setting, by the UE, the backoff parameter to the initial value, or setting the backoff parameter to the value indicated in the backoff indicator; using, by the UE, an RA priority corresponding to the second BWP, and adjusting, based on at least the RA priority corresponding to the second BWP, at least one of the backoff parameter, the power increment value, the power ramping counter (power ramping counter), and the preamble counter preamble counter (preamble counter) preamble counter; continuing, by the UE, to use the first transmit beam, where the first beam is a transmit beam used by the UE before or when the UE receives the switching indication information or before the UE switches to the second BWP; and switching, by the UE, from the first transmit beam to the second transmit beam, where the second transmit beam is different from the first transmit beam.

According to the method, when performing the RA procedure on the second BWP, the UE initializes some used parameters, for example, initializes the value of the power ramping counter and the backoff parameter. In this way, the UE may not need to keep the parameters, and incompatibility with the original random access procedure is avoided, so that the UE implements standardization of the random access procedure, to reduce impact caused by the UE to the network.

In step 57, in another possible design, the performing, by the UE, the RA procedure on the second BWP includes at least any one of the following:

continuing to use the value of the power ramping counter of the user equipment; continuing to use the backoff parameter of the user equipment; using, by the UE, a random access priority corresponding to the second BWP, and adjusting, based on at least the random access priority corresponding to the second BWP, at least one of the backoff parameter, the power increment value, the power ramping counter (power ramping counter), and the preamble counter preamble counter (preamble counter) preamble counter; continuing, by the UE, to use the first transmit beam, where the first beam is a transmit beam used by the UE before or when the UE receives switching indication information or before the UE switches to the second BWP; and switching, by the UE, from the first transmit beam to the second transmit beam, where the second transmit beam is different from the first transmit beam.

According to the method provided in this application, when the UE performs the RA procedure on the second BWP, the UE continues to use some original parameters, for example, continues to use the value of the power ramping counter and the backoff parameter, so that inappropriate impact caused to the system by a change of the parameter used by the UE can be prevented, interference caused to the network can be avoided, and unfair contention can be avoided. The UE continues to use the first transmit beam, so that the random access procedure of the UE can be accelerated. The UE switches to the second transmit beam, so that the UE can obtain a better reception gain, and the UE implements standardization of the random access procedure, to reduce impact caused by the UE to the network.

In a possible design, if both the first BWP and the second BWP meet the condition for performing a random access procedure, selecting one BWP from the first BWP and the second BWP based on a preset selection condition, to perform the random access procedure includes:

(1) The UE selects a BWP having relatively high numerology (numerology) from the first BWP and the second BWP, to perform the random access procedure.

(2) The UE selects a BWP having a relatively high random access configuration priority from the first BWP and the second BWP, to perform the random access procedure.

(3) The UE selects, from the first BWP and the second BWP, a BWP having a non-contention-based random access resource, to perform the random access procedure.

(4) If the counter corresponding to the scheduling request configuration of the UE reaches a largest value, the UE selects a BWP corresponding to an LCH logical channel corresponding to the scheduling request configuration, to perform the random access procedure.

(5) The UE selects a BWP whose corresponding LCH logical channel has buffer data, to perform the random access procedure.

(6) If an LCH logical channel corresponding to the first BWP has buffer data, and an LCH logical channel corresponding to the second BWP has buffer data, the UE selects a BWP whose corresponding LCH logical channel has a higher priority or a BWP whose corresponding LCH logical channel has a higher random access configuration priority, to perform the random access procedure.

(7) If the first transmit beam of the UE cannot reach the network device on the second BWP, the UE selects the first BWP to perform the random access procedure, where the first transmit beam is a transmit beam used by the UE on the first BWP.

(8) If the second transmit beam of the UE cannot reach the network device on the first BWP, the UE selects the second BWP to perform the random access procedure, where the second transmit beam is a transmit beam used by the UE on the second BWP.

(9) If the UE switches from the first transmit beam to the second transmit beam, and the second transmit beam of the UE cannot reach the network device on the second BWP, the UE selects the first BWP, to perform the random access procedure.

(10) If the UE switches from the first transmit beam to the second transmit beam, and the second transmit beam of the UE cannot reach the network device on the first BWP, the UE selects the second BWP, to perform the random access procedure.

According to the method, the UE currently works on the first BWP, and can select, based on whether the first BWP meets the condition for performing a random access procedure, which BWP is used to perform the random access procedure. Further, the UE receives the BWP switching indication information when performing the random access procedure on the first BWP, to choose whether to continue to complete the random access procedure on the first BWP, or switch to the second BWP to complete the random access procedure, to ensure that the UE completes random access in a timely manner.

The following describes in detail the foregoing random access method by using several examples.

Example 1

The UE performs an RA procedure on a currently active first BWP pair, and receives a BWP switching instruction, and the UE cannot perform the RA procedure on a second BWP pair that is activated after BWP switching is performed, where the second BWP pair includes a second UL BWP and a second DL BWP, his may be specifically any one of the following cases:

(1) The UE receives UL BWP switching indication information, and no physical random access channel resource resource (Physical Random Access Channel, PRACH) used for random access is configured in the second UL BWP.

(2) The UE receives DL BWP switching indication information, and no CSS used to receive an RAR is configured in the second DL BWP.

(3) The UE receives BWP pair switching indication information, and no PRACH resource used for random access is configured in the second UL BWP and/or no CSS used to receive an RAR is configured in the second DL BWP.

If any one of the foregoing three cases occurs, the UE continues to perform the RA procedure on the currently active first BWP pair, and the UE performs a BWP switching process after completing the RA procedure.

It should be noted that a BWP pair may be alternatively referred to as a BWP, and the BWP includes an uplink BWP and a downlink BWP.

In this way, the UE can complete the random access procedure in a timely manner, to avoid a case in which the random access procedure cannot be completed after the second BWP pair is switched to.

Example 2

The UE performs an RA procedure on a currently active first BWP pair, and receives BWP switching indication information, and the UE may perform the RA procedure on a second BWP pair. This may be specifically any one of the following cases:

(1) The UE receives UL BWP switching indication information, and a PRACH resource used for random access is configured in a second UL BWP, where a BWP pair that is activated after BWP switching is performed includes the second UL BWP and a first DL BWP.

(2) The UE receives DL BWP switching indication information, and a CSS used to receive an RAR is configured in a second DL BWP, where a BWP pair that is activated after BWP switching is performed includes the second DL BWP and a first UL BWP.

(3) The UE receives BWP pair switching indication information, a PRACH resource used for random access is configured in a second UL BWP, and a CSS used to receive an RAR is configured in a second DL BWP.

If any one of the foregoing three cases occurs, in a possible design, the UE continues the RA procedure on the currently active first BWP pair, and the UE executes a BWP switching instruction after completing the RA procedure.

In another possible design, the UE stops the RA procedure on the currently active first BWP pair, and the UE performs a BWP switching process, reinitiates the RA procedure on a second BWP pair that is activated after the switching, and initializes random access parameters such as a counter and a backoff parameter.

In another possible design, the UE stops the RA procedure on the currently active first BWP pair, the UE performs a BWP switching process and continues the RA procedure on a second BWP pair that is activated after the switching, and the UE continues to use random access parameters such as a counter and a backoff parameter, and does not initialize the parameters.

In another possible design, the UE completes a current round of RA procedure on the currently active first BWP pair; and if the RA procedure fails, the UE performs a BWP switching process, reinitiate the RA procedure on a second BWP pair that is activated after the switching, and initializes random access parameters such as a counter and a backoff parameter; or if the RA procedure succeeds, the UE merely needs to perform a BWP switching process, and in this case, does not need to reinitiate the RA procedure on a second BWP pair that is activated after the switching.

In another possible design, the UE completes a current round of RA procedure on the currently active first BWP pair; and if the RA procedure fails, the UE performs a BWP switching process and reinitiates the RA procedure on a second BWP pair that is activated after the switching, and the UE continues to use random access parameters such as a counter and a backoff parameter, and does not initialize the parameters; or if the RA procedure succeeds, the UE merely needs to perform a BWP switching process.

It should be noted that a BWP pair may be alternatively referred to as a BWP, and the BWP includes an uplink BWP and a downlink BWP.

According to the foregoing process, the UE can switch to the second BWP to complete the random access procedure, and set a parameter used in the random access procedure, to meet a requirement of a standard setting, reduce interference to a network, and implement interworking.

Example 3

The UE needs to perform RA. For the currently active first BWP pair, which is also referred to as the first BWP, if no PRACH resource used for random access is configured in a first UL BWP and/or no CSS used to receive an RAR is configured in a first DL BWP, the UE switches to a default BWP pair, which is also referred to as a default BWP, to initiate an RA procedure.

Alternatively, when the UE needs to perform contention-based RACH, if the currently active first BWP pair of the UE is not a default BWP pair, the UE switches to the default BWP pair to initiate an RACH procedure.

After the RA procedure is completed, an active BWP pair of the UE is the default BWP pair.

Optionally, after the RA procedure is completed, the UE may switch to the original first BWP pair.

The default BWP pair may be an initial active BWP pair, or the default BWP pair is a BWP in which a PRACH resource is configured, or the default BWP pair is a BWP configured by the network device for the UE.

It should be noted that a BWP pair may be alternatively referred to as a BWP, and the BWP includes an uplink BWP and a downlink BWP.

In this way, the UE may switch to a BWP pair in which an RACH resource used for random access is configured, to complete the RA procedure, so that the UE can complete the RA procedure in a timely manner. Then, the UE activates the default BWP pair. Alternatively, the UE switches to the original active (active) first BWP pair after completing the RA procedure.

Example 4

The network device configures at least a first BWP and a second BWP for the UE, and the UE currently works on the first BWP.

Cases after the UE receives BWP switching indication information are as follows:

Case 1: The UE needs to perform an RA procedure. If the RA procedure cannot be performed on the second BWP, for example, no PRACH resource used for random access is configured in the second BWP and/or no CSS used to receive an RAR is configured in the second BWP, where the second BWP is a BWP configured by the network device for the UE, the UE initiates the random access procedure on the first BWP. Optionally, the UE switches to the second BWP after completing the random access procedure.

Case 2: The UE needs to perform an RA procedure. If a bandwidth part inactivity timer of the UE triggers the UE to use the second BWP, or a gNB instructs the UE to use the second BWP, and if the RA procedure can be performed on the second BWP, for example, a PRACH resource used for random access is configured in the second BWP and/or a CSS used to receive an RAR is configured in the second BWP, the UE initiates the random access procedure on the second BWP. Optionally, the UE stops the random access procedure on the first BWP, or the UE initiates the random access procedure on the first BWP, and if the random access procedure fails, the UE initiates the random access procedure on the second BWP.

Case 3: The UE selects a BWP having relatively high numerology, to initiate a random access procedure.

If numerology corresponding to the first BWP is relatively high, for example, the numerology of the first BWP is higher than numerology of the second BWP, the UE initiates the random access procedure on the first BWP. Optionally, the UE switches to the second BWP after completing the random access procedure.

If numerology corresponding to the second BWP is relatively high, for example, the numerology of the second BWP is higher than numerology of the first BWP, the UE selects the second BWP to initiate the random access procedure. Optionally, the UE stops the random access procedure on the first BWP, or the UE initiates the random access procedure on the first BWP, and if the random access procedure fails, the UE initiates the random access procedure on the second BWP.

Case 4: A gNB instructs the UE to use a BWP having relatively high numerology, to initiate an RA procedure.

For example, numerology of the first BWP is higher than numerology of the second BWP, and the gNB instructs the UE to select the first BWP to initiate the random access procedure.

For another example, numerology of the second BWP is higher than numerology of the first BWP, and the gNB instructs the UE to select the second BWP to initiate the random access procedure.

Case 5: The UE selects a BWP having relatively high RA configuration, to initiate a random access procedure.

If RA configuration corresponding to the first BWP is relatively high, and is higher than RA configuration of the second BWP, the UE selects the first BWP to initiate the random access procedure. Optionally, the UE switches to the second BWP after completing the random access procedure.

Specifically, the RA configuration may include a backoff parameter (Backoff parameter) and a power (power). For example, if a backoff parameter on the first BWP is less than a backoff parameter on the second BWP it may be considered that the RA configuration of the first BWP is higher than the RA configuration of the second BWP. Alternatively, for example, if a power on the first BWP is less than a power on the second BWP, it may be considered that the RA configuration of the first BWP is higher than the RA configuration of the second BWP.

If RA configuration corresponding to the second BWP is relatively high, and is higher than RA configuration of the first BWP, the UE selects the second BWP to initiate the random access procedure. Optionally, the UE stops the random access procedure on the first BWP, or the UE initiates the random access procedure on the first BWP, and if the current round of random access procedure fails, the UE initiates the random access procedure on the second BWP.

Case 6: A gNB instructs the UE to use a BWP having relatively high RA configuration, to initiate RA. For example, RA configuration of the first BWP is higher than RA configuration of the second BWP, and the gNB instructs the UE to select the first BWP to initiate the random access procedure.

For another example, RA configuration of the second BWP is higher than RA configuration of the first BWP, and the gNB instructs the UE to select the second BWP to initiate the random access procedure.

Case 7: The UE selects a BWP in which a non-contention-based PRACH resource is configured, to initiate an RA procedure.

If the non-contention-based PRACH resource is configured in the first BWP, the UE selects the first BWP to initiate the random access procedure. Optionally, the UE switches to the second BWP after completing the random access procedure.

If the non-contention-based PRACH resource is configured in the second BWP, the UE selects the second BWP to initiate the random access procedure. Optionally, the UE stops the random access procedure on the first BWP, or the UE initiates the random access procedure on the first BWP, and if the current round of random access procedure fails, the UE initiates the random access procedure on the second BWP.

Case 8: A gNB instructs the UE to use a BWP in which a non-contention-based PRACH resource is configured, to initiate an RA procedure.

For example, if the non-contention-based PRACH resource is configured in the first BWP, the gNB instructs the UE to select the first BWP to initiate the random access procedure.

For another example, if the non-contention-based PRACH resource is configured in the second BWP, the gNB instructs the UE to select the second BWP to initiate the random access procedure.

Case 9: A counter corresponding to SR configuration of the UE reaches a largest value (it may be referred to as an SR failure), the UE uses a BWP corresponding to a logical channel (logical channel, LCH) corresponding to the SR configuration, to initiate a random access procedure, and in this case, the SR configuration corresponds to the LCH, and the LCH corresponds to the BWP.

For example, the LCH corresponding to the SR configuration corresponds to the first BWP, and the UE selects the first BWP to initiate the random access procedure.

Alternatively, for another example, the LCH corresponding to the SR configuration corresponds to the second BWP, and the UE selects the second BWP to initiate the random access procedure. Optionally, the UE stops the random access procedure on the first BWP, or the UE initiates the random access procedure on the first BWP, and if the random access procedure fails, the UE initiates the random access procedure on the second BWP.

Case 10: The UE uses a BWP corresponding to an LCH having buffer data (buffer data), to initiate a random access procedure, and if a plurality of LCHs have buffer data, the UE selects a BWP corresponding to an LCH, to initiate the random access procedure.

For example, the first BWP is selected according to random access configuration corresponding to an LCH having buffer data, and the UE selects the first BWP to initiate the random access procedure.

For another example, the second BWP is selected according to random access configuration corresponding to an LCH having buffer data, and the UE selects the second BWP to initiate the random access procedure. Optionally, the UE stops the random access procedure on the first BWP, or the UE initiates the random access procedure on the first BWP, and if the random access procedure fails, the UE initiates the random access procedure on the second BWP.

Case 11: The UE selects a BWP according to random access configuration corresponding to an LCH having buffer data, to initiate a random access procedure.

For example, the first BWP is selected according to random access configuration corresponding to an LCH having buffer data, and the UE selects the first BWP to initiate the random access procedure.

For another example, the second BWP is selected according to random access configuration corresponding to an LCH having buffer data, and the UE selects the second BWP to initiate the random access procedure. Optionally, the UE stops the random access procedure on the first BWP, or the UE initiates the random access procedure on the first BWP, and if the random access procedure fails, the UE initiates the random access procedure on the second BWP.

Case 12: The UE selects an LCH based on a priority of an LCH having buffer data, and uses a BWP corresponding to the LCH, to initiate a random access procedure.

For example, the UE selects an LCH based on a priority of an LCH having buffer data, and uses the first BWP corresponding to the LCH, to initiate the random access procedure.

For another example, the UE selects an LCH based on a priority of an LCH having buffer data, and uses the second BWP corresponding to the LCH, to initiate the random access procedure. Optionally, the UE stops the random access procedure on the first BWP, or the UE initiates the random access procedure on the first BWP, and if the random access procedure fails, the UE initiates the random access procedure on the second BWP.

Case 13: The UE selects a corresponding BWP based on a priority of a parameter that is of a random access procedure and that is configured for an LCH having buffer data, to initiate a random access procedure.

For example, the UE selects the first BWP based on the priority of the parameter that is of the random access procedure and that is configured for the LCH having buffer data, to initiate the random access procedure.

For another example, the UE selects the second BWP based on the priority of the parameter that is of the random access procedure and that is configured for the LCH having buffer data, to initiate the random access procedure.

Optionally, the UE stops the random access procedure on the first BWP, or the UE initiates the random access procedure on the first BWP, and if the random access procedure fails, the UE initiates the random access procedure on the second BWP.

Case 14: The UE initiates a random access procedure. If the UE uses the first transmit beam on the first BWP, the UE switches to the second transmit beam on the second BWP, and the second transmit beam can cover (cover) the first BWP, the UE selects the first BWP to initiate the random access procedure. If the second transmit beam cannot cover the first BWP, the UE selects the second BWP to initiate the random access procedure.

Optionally, the UE stops the random access procedure on the first BWP, or the UE initiates the random access procedure on the first BWP, and if the random access procedure fails, the UE initiates the random access procedure on the second BWP.

Case 15: The UE switches back to a default BWP to perform an RA procedure. An active first BWP pair of the UE after the RA procedure is completed is a default BWP pair, or the UE switches back to the original first BWP pair after the RA procedure is completed.

The default BWP may be the initial BWP.

It should be noted that priorities of LCHs, or priorities of parameters, or random access procedure configuration may be distinguished based on one or more of QoS, a service, a latency latency (latency), stringent (stringent), a transmission time interval (transmission time interval, TI) length, a data waiting time, and the like.

Optionally, before the UE initiates RA, the gNB notifies the UE of one or more of the following: which BWP has a PRACH resource, an SS block, and the like, for example, a PRACH resource used for random access is configured in the first BWP, and no PRACH resource used for random access is configured in the second BWP, or a PRACH resource used for random access is configured in each of the first BWP and the second BWP, but the BWPs correspond to different numerology, or a contention-based PRACH resource is configured in the first BWP, and a non-contention-based PRACH resource is configured in the second BWP; or the gNB notifies the UE of a BWP corresponding to an LCH of the UE. The gNB may notify the UE of the foregoing information by using RRC, a SIB, or the like.

Optionally, the gNB configures a PRACH resource, and the gNB allocates PRACH resources of different UEs to different BWPs, and may specifically allocate the PRACH resources based on QoS required by the UE.

Optionally, the UE initiates the random access procedure on the first BWP. The UE does not perform deactivation (deactivate), for example, a state machine (state machine) of the UE is not set to be deactivated (deactivate). After completing RA on the first BWP, the UE deactivates the BWP, for example, the state machine of the UE is set to be deactivated.

Optionally, the UE switches to the second BWP after completing a random procedure.

Optionally, the UE initiates the random access procedure on the first BWP, a BWP inactivity timer maintained by the UE stops, and after completing the RA on the first BWP, the UE switches to the second BWP (for example, a default BWP).

Optionally, the UE initiates the random access procedure on the first BWP, and continues to use (does not initialize) a parameter used by the UE, for example, a power ramping counter (counter of power ramping) or a backoff parameter. For example, a value of the counter is X, and the UE continues to use the counter based on X (for example, X remains unchanged, or X is increased by 1). For example, a value of the backoff parameter is Y, and the UE continues to use the backoff parameter based on Y.

For example, the UE selects a random backoff time random backoff time based on the backoff parameter (for example, the value is Y), and the first user equipment reinitiates the random access procedure to the network device after the random backoff time.

For example, when the UE does not change a Tx beam, the power ramping counter continues to count, for example, X is increased by 1. When the UE changes a Tx beam, the power ramping counter remains unchanged, for example, X remains unchanged.

Optionally, the UE initiates the random access procedure on the second BWP, and continues to use (does not initialize) a parameter used by the UE, for example, a power ramping counter or a backoff parameter. For example, a value of the counter is X, and the UE continues to use the counter based on X. For example, a value of the backoff parameter is Y, and the UE continues to use the backoff parameter based on Y.

For example, the UE selects a random backoff time random backoff time based on the backoff parameter (for example, the value is Y), and the first user equipment reinitiates the random access procedure to the network device after the random backoff time.

For example, when the UE does not change a Tx beam, the power ramping counter continues to count, for example, X is increased by 1. When the UE changes a Tx beam, the power ramping counter remains unchanged, for example, X remains unchanged.

Alternatively, the UE initiates the random access procedure on the second BWP, and initializes a parameter used by the UE, for example, a power ramping counter and/or a backoff parameter. For example, the counter is set to an initial value (for example, the initial value is 0 or 1). For example, a value of the backoff parameter is an initial value (for example, the initial value is a value in a backoff indicator (backoff indicator. BI) in an RAR, or is 0 ms).

For example, the UE selects a random backoff time random backoff time based on the backoff parameter (the initial value), and the first user equipment reinitiates the random access procedure to the network device after the random backoff time.

For example, when the UE does not change a Tx beam, the power ramping counter continues to count, for example, the initial value is increased by 1. When the UE changes a Tx beam, the power ramping counter remains unchanged, for example, the initial value remains unchanged.

Optionally, the UE initiates the random access procedure on the second BWP, and does not change a parameter used by the UE, for example, the first transmit beam used by the UE. In other words, the UE uses the first transmit beam on the first BWP, and still uses the first transmit beam on the second BWP.

Alternatively, the UE initiates the random access procedure on the second BWP, and changes a parameter used by the UE, for example, the first transmit beam used by the UE. In other words, the UE uses the first transmit beam on the first BWP, and still uses the second transmit beam on the second BWP.

Optionally, the UE initiates the random access procedure on the second BWP, and does not change a first transmit beam of the gNB selected by the UE. In other words, the UE selects the first transmit beam of the gNB on the first BWP, and still selects the first transmit beam of the gNB on the second BWP.

Further, if the UE supports a beam correspondence (correspondence), the UE correspondingly selects a transmit beam of the UE. In other words, there is a correspondence between the first transmit beam of the gNB and a first transmit beam of the UE, and the UE correspondingly selects the first transmit beam of the UE.

Alternatively, the UE initiates the random access procedure on the second BWP, and changes a first transmit beam of the gNB selected by the UE. In other words, the UE selects the first transmit beam of the gNB on the first BWP, and still selects the second transmit beam of the gNB on the second BWP.

Further, if the UE supports a beam correspondence, the UE correspondingly selects a transmit beam of the UE. In other words, there is a correspondence between the second transmit beam of the gNB and a second transmit beam of the UE, and the UE correspondingly selects the second transmit beam of the UE.

In this application, that the UE works on a BWP means that the UE uses a resource corresponding to the BWP. For example, the resource corresponding to the BWP includes at least one of an uplink resource and a downlink resource. For example, that the UE initiates random access on the first BWP means that the UE uses a resource corresponding to the first BWP, to initiate random access. For another example, that the UE initiates random access on the second BWP means that the UE uses a resource corresponding to the second BWP, to initiate random access. For another example, that the UE switches to the second BWP means that the UE uses a resource corresponding to the second BWP. For another example, that the UE switches to the first BWP means that the UE uses a resource corresponding to the first BWP.

In this application, that the UE initiates random access may be directly replaced with that the UE performs random access, and details are not described in this application. For example, that the UE initiates random access on the first BWP may be replaced with that the UE performs random access on the first BWP. For another example, for example, that the UE initiates random access on the second BWP may be replaced with that the UE performs random access on the second BWP.

It should be noted that, that the UE performs a random access procedure on a BWP means that the UE sends a message in an access procedure by using a resource in the BWP, for example, a preamble, and/or a third message in the random access procedure.

In addition, that the UE switches the first BWP means that the UE no longer uses a resource corresponding to the first BWP. For example, switching a first uplink BWP means that a resource corresponding to the first uplink BWP is no longer used. For example, switching a first downlink BWP means that a resource corresponding to the first downlink BWP is no longer used. For example, switching the first uplink BWP and the first downlink BWP means that the resource corresponding to the first uplink BWP and the resource corresponding to the first downlink BWP are no longer used.

Switching to the second BWP means that a resource corresponding to the second BWP is used. For example, switching to a second uplink BWP means that a resource corresponding to the second uplink BWP is used. For example, switching to a second downlink BWP means that a resource corresponding to the second downlink BWP is used. For example, switching to the second uplink BWP and the second downlink BWP means that the resource corresponding to the second uplink BWP and the resource corresponding to the second downlink BWP are used.

It should be noted that, that a transmit beam of the user equipment covers a BWP may be alternatively referred to as that the transmit beam of the user equipment can reach the gNB on the BWP.

That the second transmit beam can cover the first BWP may be alternatively referred to as that the second transmit beam can reach the gNB on the first BWP. If the UE uses the second transmit beam, that the second transmit beam cannot cover the second BWP may be alternatively referred to as that the second transmit beam cannot reach the gNB on the second BWP. That a transmit beam of the user equipment can reach the network device on a BWP may be alternatively referred to as that the transmit beam of the user equipment can cover the network device on the BWP.

For example, that the first transmit beam of the user equipment can reach the network device on the first BWP may be alternatively referred to as that the first transmit beam of the user equipment can cover the network device on the first BWP.

That the transmit beam of the user equipment cannot reach the network device on the BWP may be alternatively referred to as that the transmit beam of the user equipment cannot cover the network device on the BWP, or that a beam failure (beam failure) occurs in the transmit beam of the user equipment.

For example, that the first transmit beam of the user equipment cannot reach the network device on the first BWP may be alternatively referred to as that the first transmit beam of the user equipment cannot cover the network device on the first BWP, or that a beam failure occurs in the first transmit beam.

It should be noted that the first BWP may include a first uplink BWP, and the second BWP may include a first uplink BWP. Alternatively, the first BWP may include a first downlink BWP, and the second BWP may include a second downlink BWP. Alternatively, the first BWP may include a first uplink BWP and a first downlink BWP, and the second BWP may include a second uplink BWP and a second downlink BWP. Alternatively, the first BWP may include a first uplink BWP, and the second BWP may include a second downlink BWP. Alternatively, the first BWP may include a first downlink BWP, and the second BWP may include a second uplink BWP.

A BWP pair may be alternatively referred to as a BWP, and the BWP includes an uplink BWP and a downlink BWP.

The first BWP may be alternatively referred to as a first BWP pair, and the first BWP includes the first uplink BWP and the first downlink BWP.

The second BWP may be alternatively referred to as a second BWP pair, and the second BWP includes the second uplink BWP and the second downlink BWP.

The initial BWP may be alternatively referred to as an initial BWP pair, and the initial BWP includes an initial uplink BWP and an initial downlink BWP.

The default BWP may be alternatively referred to as a default BWP pair, and the default BWP includes a default uplink BWP and a default downlink BWP.

Further, when the user equipment performs the random access procedure on the first BWP, or before the user equipment performs the random access procedure on the first BWP, or after the user equipment performs the random access procedure on the first BWP, the user equipment receives the BWP switching indication information sent by the network device, or the bandwidth part inactivity timer of the user triggers the user equipment to use the second BWP.

Further, the user equipment initiates the random access procedure before, when, or after the user equipment uses the second BWP. For example, if the second BWP meets the condition for performing a random access procedure, the user equipment performs the random access procedure on the second BWP, or if the first BWP meets the condition for performing a random access procedure, the user equipment performs the random access procedure on the first BWP, or if the second BWP does not meet the condition for performing a random access procedure, the user equipment performs the random access procedure on the first BWP, or if the first BWP does not meet the condition for performing a random access procedure, the user equipment performs the random access procedure on the second BWP.

It should be noted that, that the UE performs the random access procedure may be that the gNB instructs the UE to perform RA, or the UE needs to initiate RA when the counter corresponding to the SR configuration scheduling request configuration of the UE reaches the largest value, or the UE is out of synchronization, or a radio link failure occurs, or the UE needs establish an RRC radio resource control connection to the gNB.

It is further noted that a random access priority may be alternatively referred to as a random access adjustment parameter. The UE uses a random access adjustment parameter corresponding to a BWP, and adjusts at least one of the following based on at least the random access adjustment parameter corresponding to the BWP: the backoff parameter, the power increment value, the power ramping counter, and the preamble counter. For example, the UE uses an RA adjustment parameter corresponding to the first BWP, and adjusts at least one of the following based on at least the random access adjustment parameter corresponding to the first BWP: the backoff parameter, the power increment value, the power ramping counter, and the preamble counter. For example, the UE uses an RA adjustment parameter corresponding to the second BWP, and adjusts at least one of the following based on at least the random access adjustment parameter corresponding to the second BWP; the backoff parameter, the power increment value, the power ramping counter, and the preamble counter. For example, the UE uses an RA adjustment parameter corresponding to the initial BWP, and adjusts at least one of the following based on at least the random access adjustment parameter corresponding to the initial BWP: the backoff parameter, the power increment value, the power ramping counter, and the preamble counter.

It is further noted that completing a random access procedure on a BWP may be that the random access procedure succeeds, or that the random access procedure fails, or that the user equipment successfully completes the random access procedure on the BWP, or that the user equipment successfully completes the random access procedure on the BWP, but the user equipment fails in access, or that the user equipment successfully accesses the network device, and the user equipment fails in access.

Specifically, the user equipment performs the random access procedure on the first BWP, and does not deactivate the first BWP, or the user equipment keeps the first BWP activated, or the user equipment stops the bandwidth part inactivity timer used to maintain the first BWP, or the user equipment deactivates the first BWP after the user equipment performs the random access procedure on the first BWP.

It should be noted that, that the UE works on the first BWP is specifically: sending information on an uplink shared channel (uplink share channel, UL-SCH), sending information on a random access channel (random access channel, RACH), receiving information on a downlink shared channel (downlink share channel. DL-SCH), receiving information on a physical downlink control channel (Physical Downlink Control Channel, PDCCH), for example, downlink control information (downlink control information, DCI) information, and sending information on a physical uplink control channel (Physical uplink Control Channel, PUCCH), for example, downlink control information (uplink control information, UCI) information.

In this application, that a resource used for random access is available in a BWP may be specifically that the resource used for random access exists in an uplink BWP of the BWP. For example, that a resource used for random access is available in the first BWP is specifically that the resource used for random access exists in a first uplink BWP of the first BWP. Optionally, for example, that a resource used for random access is available in the second BWP is specifically that the resource used for random access exists in a second uplink BWP of the second BWP. Optionally, for example, a resource used for random access is available in an initial BWP is specifically that the resource used for random access exists in an initial uplink BWP of the initial BWP.

Further, that no resource used for random access is configured in a BWP may be specifically that no resource used for random access is configured in an uplink BWP of the BWP. For example, no resource used for random access is configured in the first BWP. For another example, no resource used for random access is configured in a first uplink BWP of the first BWP.

In this application, the initial BWP is indicated by the network device in system information. Further, the initial BWP is configured under a limitation of a capability of the UE device.

The performing, by the UE, the random access procedure on an initial BWP is specifically performing a contention-based random access procedure.

Specifically, keeping the first BWP activated includes keeping the first uplink BWP activated, and/or keeping the first downlink BWP activated.

Optionally, skipping deactivating the first BWP includes skipping deactivating the first uplink BWP, and/or skipping deactivating the first downlink BWP.

For example, the UE keeps the first BWP in a state.

Optionally, keeping the first BWP in an activated state includes keeping the first uplink BWP in an activated state, and/or keeping the first downlink BWP in an activated state.

Optionally, skipping deactivating the state of the first BWP includes skipping deactivating the state of the first uplink BWP, and/or skipping deactivating the state of the first downlink BWP.

It is further noted that the bandwidth part inactivity timer may be alternatively referred to as a BWP timer, and a function is to trigger the user equipment to switch a non-default BWP to a default BWP.

Optionally, the non-default BWP is different from the default BWP. For example, a non-default uplink BWP is different from the default uplink BWP, and/or a non-default downlink BWP is different from the default downlink BWP.

Optionally, the first BWP is used as an example of the non-default BWP. For example, the UE works on the first BWP, and the UE switches the first BWP to the default BWP when the bandwidth part inactivity timer reaches a time or expires or times out (for example, reaches the largest value or a smallest value). Optionally, that the UE switches the first BWP to the default BWP may be specifically that the UE switches the first downlink BWP to the default downlink BWP, or that the UE switches the first uplink BWP and the first downlink BWP to the default uplink BWP and the default downlink BWP.

Optionally, a bandwidth part inactivity timer used to maintain the non-default BWP may be a bandwidth part inactivity timer used to maintain the non-default downlink BWP. For example, the bandwidth part inactivity timer used to maintain the first BWP may be a bandwidth part inactivity timer used to maintain the first downlink BWP.

Optionally, the bandwidth part inactivity timer used to maintain the non-default downlink BWP may be alternatively referred to as the bandwidth part inactivity timer corresponding to the non-default BWP. For example, the bandwidth part inactivity timer used to maintain the first BWP may be alternatively referred to as the bandwidth part inactivity timer corresponding to the first BWP. For another example, the bandwidth part inactivity timer used to maintain the first downlink BWP may be alternatively referred to as the bandwidth part inactivity timer corresponding to the first downlink BWP.

Optionally, the bandwidth part inactivity timer used to maintain the non-default BWP may be alternatively referred to as the bandwidth part inactivity timer applied to the non-default BWP. For example, the bandwidth part inactivity timer used to maintain the first BWP may be alternatively referred to as the bandwidth part inactivity timer applied to the first BWP. For another example, the bandwidth part inactivity timer used to maintain the first downlink BWP may be alternatively referred to as the bandwidth part inactivity timer applied to the first downlink BWP.

Optionally, the bandwidth part inactivity timer starts timing when the non-default BWP works. For example, the bandwidth part inactivity timer starts timing when the first BWP works.

Optionally, the default BWP may be the initial BWP.

Optionally, that the UE device works on the first BWP may be that the network device schedules the UE to the first BWP. For example, the network device hands over the UE from the initial BWP to the first BWP.

In this application, setting the backoff parameter to the value in the backoff indicator is specifically that the UE switches to the second BWP, and sets the backoff parameter to a value in a backoff indicator received on the second BWP; or that the UE switches to the initial BWP, and sets the backoff parameter to a value in a backoff indicator received on the initial BWP.

After completing the RA procedure on the initial BWP, the UE waits for the network device to send the BWP switching indication information.

Further, the UE performs BWP switching after receiving the BWP switching indication information on the initial BWP.

In this application, a power increment value is adjusted. For example, a power ramping step power ramping step is adjusted.

Optionally, a power increment value corresponding to a high priority is greater than a power increment value corresponding to a low priority. For example, a first priority is higher than a second priority, and a power increment value corresponding to the first priority is greater than a power increment value corresponding to the second priority.

Optionally, a power ramping counter (power ramping counter) is adjusted. For example, a total quantity of times that a power can be increased is adjusted, or a value of the power ramping counter is adjusted, or a largest value of the power ramping counter is adjusted.

Optionally, a preamble counter is adjusted. For example, a total quantity of times that a preamble can be sent is adjusted, or a value of the preamble counter is adjusted, or a largest value of the preamble counter is adjusted.

Optionally, the BWP switching indication information is used to instruct the UE to use the second BWP, or the BWP switching indication information is used to instruct the UE to switch to the second BWP. Optionally, the second BWP is different from the first BWP, and the second BWP is a BWP indicated by the network device, namely, a target BWP that is indicated by the network device and that the UE needs to use (activate or switch to).

Optionally, that the second BWP is the BWP indicated by the network device may be specifically that the network device indicates identity information (for example, an index index or other identity information) of the BWP to the UE. The UE switches to the corresponding BWP or uses the corresponding BWP according to the identity information (for example, the index) of the BWP. For example, the UE works on the first BWP, the network device indicates an index of the second BWP to the UE, and the UE switches to the second BWP or uses the second BWP according to the index of the second BWP.

Optionally, the first BWP includes the first uplink BWP and the first downlink BWP, and the performing, by the UE, the random access procedure on the first BWP includes: using, by the UE, the first uplink BWP and the first downlink BWP, to perform the random access procedure. For example, the UE uses the first uplink BWP to send a preamble preamble, and the UE uses the first downlink BWP to receive a random access response RAR message sent by the network device.

Optionally, the second BWP includes the second uplink BWP and the second downlink BWP, and the performing, by the UE, the random access procedure on the second BWP includes: using, by the UE, the second uplink BWP and the second downlink BWP, to perform the random access procedure. For example, the UE uses the second uplink BWP to send a preamble, and the UE uses the second downlink BWP to receive an RAR message sent by the network device. Optionally, the initial BWP includes the initial uplink BWP and the initial downlink BWP, and the performing, by the UE, the random access procedure on an initial BWP includes: using, by the UE, the initial uplink BWP and the initial downlink BWP, to perform the random access procedure. For example, the UE uses the initial uplink BWP to send a preamble, and the UE uses the initial downlink BWP to receive an RAR message sent by the network device.

According to the foregoing solution, it is uncertain whether a BWP on which the UE currently works has a PRACH resource, and it is uncertain where the UE performs RA. If a random access resource and/or a CSS are/is configured in a BWP, the UE may clearly initiate RA on the specific BWP, or otherwise, the UE does not learn a location of sending uplink information. In addition, it is specified that downlink information is received on a downlink BWP, or otherwise, the UE does not learn a location of receiving a PDCCH and receiving an RAR. The UE may complete the RA procedure on a currently active BWP based on different cases, and further set, on the current BWP, a related parameter needing to be used. Alternatively, the UE switches to the second BWP to complete the RA procedure, and further sets, on the second BWP, a related parameter needing to be used. Specifically, a timer is stopped, to prevent uncertainty of whether the UE switches a BWP when the timer is triggered during the RA procedure, and better implement interworking. The BWP is kept in an activated state, to ensure consistency with a state machine of the UE, and prevent inconsistency between behavior performed by the UE in different states. Advantages of continuing to perform RA on the current BWP, and continuing to use the used parameters such as the value of the power ramping counter and the backoff parameter are as follows: Inappropriate impact caused to a system because the parameters of the UE device change is prevented, interference caused to a network is avoided, and unfair contention is avoided. The first transmit beam continues to be used, so that an access procedure of the UE can be accelerated. The second transmit beam is switched to for use, so that the UE can obtain a better reception gain. Advantages of initializing the parameters used for RA such as the value of the power ramping counter and the backoff parameter are as follows: The equipment may not need to maintain the parameters, and compatibility with the original RA procedure can be avoided. The foregoing solution can meet a requirement of a standard setting, reduce interference to the network, and implement interworking.

Example 5

The gNB instructs the UE to initiate an RA procedure.

For example, the gNB sends a PDCCH order to trigger the UE to initiate the RA procedure. Specifically, an indication may be performed by using a DCI format 1A, where CRC of the DCI format 1A is scrambled by using a C-RNTI.

The gNB instructs the UE to initiate the RA procedure. In addition, the gNB indicates an uplink BWP used by the UE. Optionally, the uplink BWP is used by the UE to send a preamble. A resource in the uplink BWP may be contention-based, or may be non-contention-based.

Optionally, the gNB may indicate, in a PRACH mask index field, an index of the uplink BWP used by the UE, or the gNB sends DCI and indicates, in the DCI, an index of the uplink BWP used by the UE.

Optionally, the gNB instructs the UE to initiate the RA procedure. In addition, the gNB indicates a downlink BWP used by the UE. Optionally, the downlink BWP is used by the UE to receive an RAR and/or an Msg4.

Optionally, the gNB may indicate, in a PRACH mask index field, an index of the uplink BWP used by the UE, or the gNB sends DCI and indicates, in the DCI, an index of the uplink BWP used by the UE.

The UE receives information about an indicated BWP (including at least one of an uplink BWP and a downlink BWP) and an indication that is sent by the gNB and that is used to initiate RA. The UE initiates the RA procedure on the indicated BWP.

In this way, when instructing the UE to initiate the RA procedure, the gNB instructs the UE to perform RA on a corresponding BWP, so that the UE selects an appropriate PRACH resource. The gNB may also learn a BWP on which the UE performs RA, facilitating determining performed by the gNB.

Example 6

The UE works on the first BWP. The UE initiates a random access procedure. The UE sends a preamble preamble on a default UL BWP. The default UL BWP is configured by the gNB, and may be the initial BWP.

Optionally, after sending the preamble, the UE switches back to the first BWP.

After receiving the preamble sent by the UE, the gNB instructs, on a default DL BWP, the UE to receive an RAR message on the second BWP.

Alternatively, the gNB instructs, on the first downlink BWP of the first BWP, the UE to receive an RAR message on the second BWP.

Alternatively, the gNB instructs, on the first downlink BWP of the first BWP, the UE to receive an RAR message on the first BWP.

Alternatively, the gNB instructs, on a default DL BWP, the UE to receive an RAR message on the first BWP. Optionally, the UE sends a third message in the random access procedure on the default UL BWP. After receiving the third message sent by the UE, the gNB instructs, on the default DL BWP, the UE to receive a fourth message in the random access procedure on the second BWP. Alternatively, the gNB instructs, on the downlink BWP of the first BWP, the UE to receive a fourth message in the random access procedure on the second BWP. Alternatively, the gNB instructs, on the downlink BWP of the first BWP, the UE to receive a fourth message in the random access procedure on the first BWP. Alternatively, the gNB instructs, on the default DL BWP, the UE to receive a fourth message in the random access procedure on the first BWP.

Example 7

A random access method, applied to UE, where the method includes:

working, by the UE, on a BWP, where the method further includes any one of the following:

the UE receives BWP switching indication information sent by a network device, where the switching indication information is used to instruct the UE to use a second BWP, or a bandwidth part inactivity timer of the user triggers the UE to use a second BWP; and the UE performs a random access procedure on the first BWP if the first BWP meets a condition for performing a random access procedure; or the UE performs a random access procedure on the second BWP if the second BWP meets a condition for performing a random access procedure; or the UE performs a random access procedure on the second BWP if the first BWP does not meet a condition for performing a random access procedure; or the UE performs a random access procedure on the first BWP if the second BWP does not meet a condition for performing a random access procedure; or if a default default BWP meets a condition for performing a random access procedure, the UE performs a random access procedure on the default BWP; or if the first BWP does not meet a condition for performing a random access procedure, the UE performs a random access procedure on the default BWP, or the UE performs a contention-based random access procedure on the default BWP; or if the first BWP meets a condition for performing a random access procedure, and the second BWP meets the condition for performing a random access procedure, the UE chooses, based on a predetermined rule, to perform a random access procedure on the first BWP, or to perform a random access procedure on the second BWP.

Optionally, the UE performs the random access procedure on the second BWP if the first BWP does not meet the condition for performing a random access procedure; or the UE performs the random access procedure on the first BWP when the second BWP does not meet the condition for performing a random access procedure.

That the first BWP does not meet the condition for performing a random access procedure includes at least any one of the following:

no resource used for random access is configured in the first BWP;

no common search space CSS used to receive a random access response RAR is configured in the first BWP;

a first transmit beam of the UE cannot reach the network device on the first BWP, and the first transmit beam is a transmit beam used by the UE on the first BWP;

the UE switches from the first transmit beam to the second transmit beam, the second transmit beam of the UE cannot reach the network device on the first BWP, and the first transmit beam is a transmit beam used by the UE on the first BWP;

a counter corresponding to scheduling request configuration of the UE reaches a largest value, and an LCH logical channel corresponding to the scheduling request configuration corresponds to the second BWP; and an LCH logical channel corresponding to the first BWP does not have buffer data.

That the second BWP does not meet the condition for performing a random access procedure includes at least any one of the following:

no resource used for random access is configured in the second BWP;

no common search space CSS used to receive a random access response RAR is configured in the second BWP;

the first transmit beam of the UE cannot reach the network device on the second BWP, and the first transmit beam is a transmit beam used by the UE on the first BWP;

the UE switches from the first transmit beam to the second transmit beam, the second transmit beam of the UE cannot reach the network device on the second BWP, and the first transmit beam is a transmit beam used by the UE on the first BWP;

the counter corresponding to the scheduling request configuration of the UE reaches the largest value, and the LCH logical channel corresponding to the scheduling request configuration corresponds to the first BWP; and the LCH logical channel corresponding to the second BWP does not have buffer data.

Optionally, the method further includes: performing, by the UE, the random access procedure on the first BWP if the first BWP meets the condition for performing a random access procedure; or performing, by the UE, the random access procedure on the second BWP if the second BWP meets the condition for performing a random access procedure; or performing, by the UE, the random access procedure on the second BWP if the first BWP does not meet the condition for performing a random access procedure; or performing, by the UE, the random access procedure on the first BWP if the second BWP does not meet the condition for performing a random access procedure; or performing, by the UE, the random access procedure on the default BWP if the default default BWP meets the condition for performing a random access procedure.

That the first BWP meets the condition for performing a random access procedure includes at least any one of the following:

a resource used for random access is available in the first BWP;

a common search space CSS used to receive a random access response RAR is available in the first BWP;

the first transmit beam of the UE can reach the network device on the first BWP, and the first transmit beam is a transmit beam used by the UE on the first BWP;

the UE switches from the first transmit beam to the second transmit beam, the second transmit beam of the UE can reach the network device on the first BWP, and the first transmit beam is a transmit beam used by the UE on the first BWP;

the counter corresponding to the scheduling request configuration of the UE reaches the largest value, and the LCH logical channel corresponding to the scheduling request configuration corresponds to the first BWP; and the LCH logical channel corresponding to the first BWP has buffer data.

That the second BWP meets the condition for performing a random access procedure includes at least any one of the following:

a resource used for random access is available in the second BWP;

a common search space CSS used to receive a random access response RAR is available in the second BWP;

the first transmit beam of the UE can reach the network device on the second BWP, and the first transmit beam is a transmit beam used by the UE on the first BWP;

the UE switches from the first transmit beam to the second transmit beam, the second transmit beam of the UE can reach the network device on the second BWP, and the first transmit beam is a transmit beam used by the UE on the first BWP;

the counter corresponding to the scheduling request configuration of the UE reaches the largest value, and the LCH logical channel corresponding to the scheduling request configuration corresponds to the second BWP; and the LCH logical channel corresponding to the second BWP has buffer data.

That the default BWP meets the condition for performing a random access procedure includes at least any one of the following:

a resource used for random access is available in the default BWP;

a common search space CSS used to receive a random access response RAR is available in the default BWP;

the first transmit beam of the UE can reach the network device on the default BWP, and the first transmit beam is a transmit beam used by the UE on the first BWP;

the UE switches from the first transmit beam to the second transmit beam, the second transmit beam of the UE can reach the network device on the default BWP, and the first transmit beam is a transmit beam used by the UE on the first BWP; the counter corresponding to the scheduling request configuration of the UE reaches the largest value, and the LCH logical channel corresponding to the scheduling request configuration corresponds to the default BWP; and the LCH logical channel corresponding to the default BWP has buffer data.

Optionally, the choosing, by the UE based on a predetermined rule, to perform a random access procedure on the first BWP, or to perform a random access procedure on the second BWP includes any one of the following:

the UE chooses to perform the random access procedure on the first BWP if numerology numerology corresponding to the first BWP is higher than numerology corresponding to the second BWP;

the UE chooses to perform the random access procedure on the first BWP if a random access configuration priority corresponding to the first BWP is higher than a random access configuration priority corresponding to the second BWP;

the UE chooses to perform the random access procedure on the first BWP if a non-contention-based random access resource is available in the first BWP;

the UE chooses to perform the random access procedure on the first BWP if the counter corresponding to the scheduling request configuration of the UE reaches the largest value, and the LCH logical channel corresponding to the scheduling request configuration corresponds to the first BWP;

the UE chooses to perform the random access procedure on the first BWP if the LCH logical channel corresponding to the first BWP has buffer data;

the UE chooses to perform the random access procedure on the first BWP if the LCH logical channel corresponding to the first BWP has buffer data, the LCH logical channel corresponding to the second BWP has buffer data, and a priority of the LCH logical channel corresponding to the first BWP is higher than a priority of the LCH logical channel corresponding to the second BWP;

the UE chooses to perform the random access procedure on the first BWP if the LCH logical channel corresponding to the first BWP has buffer data, the LCH logical channel corresponding to the second BWP has buffer data, and a random access configuration priority of the LCH logical channel corresponding to the first BWP is higher than random access configuration of the LCH logical channel corresponding to the second BWP;

if the first transmit beam of the UE cannot reach the network device on the second BWP, the first transmit beam is a transmit beam used by the UE on the first BWP;

if the UE switches from the first transmit beam to the second transmit beam, and the second transmit beam of the UE cannot reach the network device on the second BWP, the first transmit beam is a transmit beam used by the UE on the first BWP;

the UE chooses to perform the random access procedure on the second BWP if numerology numerology corresponding to the second BWP is higher than numerology corresponding to the first BWP;

the UE chooses to perform the random access procedure on the second BWP if a random access configuration priority corresponding to the second BWP is higher than a random access configuration priority corresponding to the first BWP;

the UE chooses to perform the random access procedure on the second BWP if a non-contention-based random access resource is available in the second BWP;

the UE chooses to perform the random access procedure on the second BWP if the counter corresponding to the scheduling request configuration of the UE reaches the largest value, and the LCH logical channel corresponding to the scheduling request configuration corresponds to the second BWP;

the UE chooses to perform the random access procedure on the second BWP if the LCH logical channel corresponding to the second BWP has buffer data;

the UE chooses to perform the random access procedure on the second BWP if the LCH logical channel corresponding to the first BWP has buffer data, the LCH logical channel corresponding to the second BWP has buffer data, and a priority of the LCH logical channel corresponding to the second BWP is higher than a priority of the LCH logical channel corresponding to the first BWP;

the UE chooses to perform the random access procedure on the second BWP if the LCH logical channel corresponding to the first BWP has buffer data, the LCH logical channel corresponding to the second BWP has buffer data, and a random access configuration priority of the LCH logical channel corresponding to the second BWP is higher than random access configuration of the LCH logical channel corresponding to the first BWP;

if the first transmit beam of the UE cannot reach the network device on the first BWP, the first transmit beam is a transmit beam used by the UE on the second BWP; and if the UE switches from the first transmit beam to the second transmit beam, and the second transmit beam of the UE cannot reach the network device on the first BWP, the first transmit beam is a transmit beam used by the UE on the second BWP.

It is further noted that the first BWP includes a first uplink BWP, and the second BWP includes a second uplink BWP; or the first BWP includes a first downlink BWP, and the second BWP includes a second downlink BWP; or the first BWP includes a first uplink BWP, and the initial BWP includes an initial uplink BWP; or the first BWP includes a first downlink BWP, and the initial BWP includes an initial downlink BWP; or the first BWP includes a first uplink BWP, and the default BWP includes a default uplink BWP; or the first BWP includes a first downlink BWP, and the default BWP includes a default downlink BWP; or the first BWP includes a first uplink BWP and a first downlink BWP; or the second BWP includes a second uplink BWP and a second downlink BWP; or the initial BWP includes an initial uplink BWP and an initial downlink BWP; or the default BWP includes an initial uplink BWP and a default downlink BWP; or the first uplink BWP is different from the second uplink BWP, and/or the first downlink BWP is different from the second downlink BWP; or the first uplink BWP is different from the initial uplink BWP, and/or the first downlink BWP is different from the initial downlink BWP; or the first uplink BWP is different from the default uplink BWP, and/or the first downlink BWP is different from the default downlink BWP.

Further, the receiving, by the UE, BWP switching indication information sent by a network device includes that the BWP switching indication information instructs the UE to switch the first uplink BWP, or the first downlink BWP, or the first BWP and the first downlink BWP; or instructs the UE to use the second uplink BWP, or the second downlink BWP, or the second uplink BWP and the second downlink BWP.

Optionally, the performing, by the UE, a random access procedure on the first BWP further includes: switching, by the UE, to the second BWP after completing the random access procedure.

Optionally, the performing, by the UE, a random access procedure on the default BWP further includes: switching, by the UE, to the first BWP after completing the random access procedure.

Optionally, the performing, by the UE, a random access procedure on the second BWP includes at least any one of the following:

setting a power ramping counter of the UE to an initial value;

setting the backoff parameter to an initial value, or to a value in a backoff indicator backoff indicator; and switching, by the UE, from the first transmit beam to the second transmit beam.

Optionally, the performing, by the UE, the random access procedure on the second BWP includes at least any one of the following:

continuing to use a value of the power ramping counter of the UE;

continuing to use the backoff parameter; and continuing, by the UE, to use the first transmit beam.

Optionally, the UE receives the BWP switching indication information sent by the network device, where the switching indication information is used to instruct the UE to use the second BWP, or the bandwidth part inactivity timer of the user triggers the UE to use the second BWP.

Further, the UE works on the first bandwidth part BWP. When the UE performs the random access procedure on the first BWP, or before the UE performs the random access procedure on the first BWP, or after the UE performs the random access procedure on the first BWP, the UE receives the BWP switching indication information sent by the network device, where the switching indication information is used to instruct the UE to use the second BWP, or the bandwidth part inactivity timer of the user triggers the UE to use the second BWP.

Optionally, the UE receives the BWP switching indication information sent by the network device, where the switching indication information is used to instruct the UE to use the second BWP, or the bandwidth part inactivity timer of the user triggers the UE to use the second BWP; and before, when, or after the UE uses the second BWP, if the second BWP meets the condition for performing a random access procedure, the UE performs the random access procedure on the second BWP; or if the first BWP meets the condition for performing a random access procedure, the UE performs the random access procedure on the first BWP; or if the second BWP does not meet the condition for performing a random access procedure, the UE performs the random access procedure on the first BWP; or if the first BWP does not meet the condition for performing a random access procedure, the UE performs the random access procedure on the second BWP.

Optionally, the performing, by the UE, a random access procedure on the first BWP further includes: skipping, by the UE, deactivating the first BWP, or keeping, by the UE, the first BWP activated, or stopping, by the UE, a bandwidth part inactivity timer used to maintain the first BWP. Further, the UE deactivates the first BWP after the UE performs the random access procedure on the first BWP.

The foregoing process provides processes in which different messages in a random access procedure are sent on different BWPs, and provides a plurality of manners of implementing a random access procedure.

Figure 6:
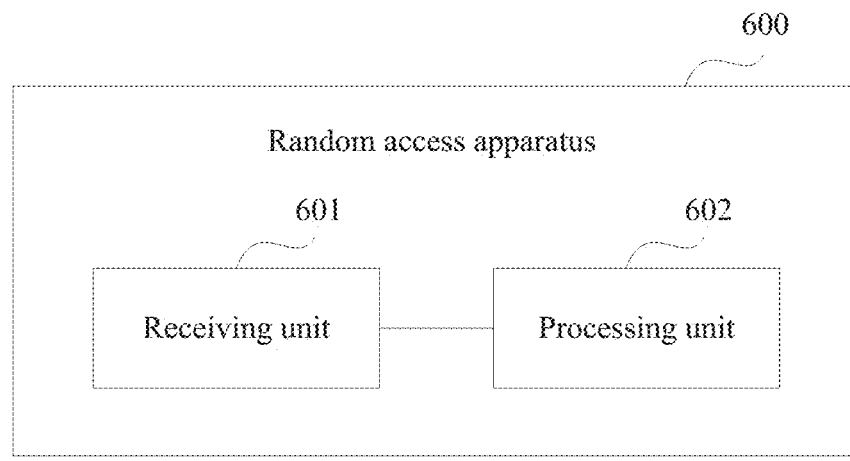
FIG. 6 is a schematic structural diagram of a random access apparatus according to this application.

Based on the foregoing method embodiments, an embodiment of this application provides a random access apparatus, which is corresponding to user equipment and is capable of implementing at least one of the foregoing method embodiments. Referring to FIG. 6, a random access apparatus 600 includes a receiving unit 601 and a processing unit 602.

A random access apparatus, where the apparatus is user equipment UE, the UE includes a processing unit 602 and a receiving unit 601, the UE works on a first bandwidth part BWP, and the first BWP is a currently active BWP.

The processing unit 602 is configured to: when the UE needs to perform a random access procedure, if the first BWP meets a condition for performing a random access procedure, enable the UE to perform the random access procedure on the first BWP; or if the first BWP does not meet a condition for performing a random access procedure, enable the UE to perform the random access procedure on an initial BWP.

The receiving unit 601 is configured to: when the UE performs the random access procedure on the first BWP, receive BWP switching indication information sent by a network device, where the BWP switching indication information is used to instruct the UE to use a second BWP.

The processing unit 602 is further configured to: continue to perform the random access procedure on the first BWP, or stop performing the random access procedure on the first BWP, and perform the random access procedure on the second BWP.

The random access apparatus 600 can implement at least one of the foregoing method embodiments. For details, refer to the foregoing method embodiments, and details are not described in this application again.

It should be understood that division of the units is merely logical function division. In actual implementation, the units may be all or partially integrated into a physical entity, or may be physically separate. In addition, the units all may be implemented by software invoked by a processing element, or all may be implemented by hardware, or some units may be implemented by software invoked by a processing element, and some units are implemented by hardware. For example, the processing unit may be a separately disposed processing element, may be implemented by being integrated into a chip, or may be stored in a memory in a form of a program, and a processing element invokes the program and executes the function of the unit. Implementations of the other units are similar. In addition, all or some of the units may be integrated together, or may be implemented independently. The processing element may be an integrated circuit and has a signal processing capability. In an implementation process, steps in the foregoing methods or the foregoing units can be implemented by using a hardware integrated logical circuit in the processing element, or by using instructions in a form of software. In addition, the receiving unit is a unit configured to control receiving, and may receive information by using a receiving apparatus of the terminal device or the network device, for example, an antenna and a radio frequency apparatus. The sending unit is a unit configured to control sending, and may send information by using a sending apparatus of the terminal device or the network device, for example, an antenna and a radio frequency apparatus.

For example, the units may be one or more integrated circuits configured to implement the foregoing method, for example, one or more application specific integrated circuits (application specific integrated circuit, ASIC), one or more digital signal processors (digital signal processor, DSP), or one or more field programmable gate arrays (field programmable gate array, FPGA). For another example, when a particular unit is implemented by the processing element invoking a program, the processing element may be a general-purpose processor, for example, a central processing unit (central processing unit, CPU) or another processor that can invoke the program. For another example, the units may be integrated together, and implemented in a form of a system on chip (system-on-a-chip, SOC).

Figure 7:
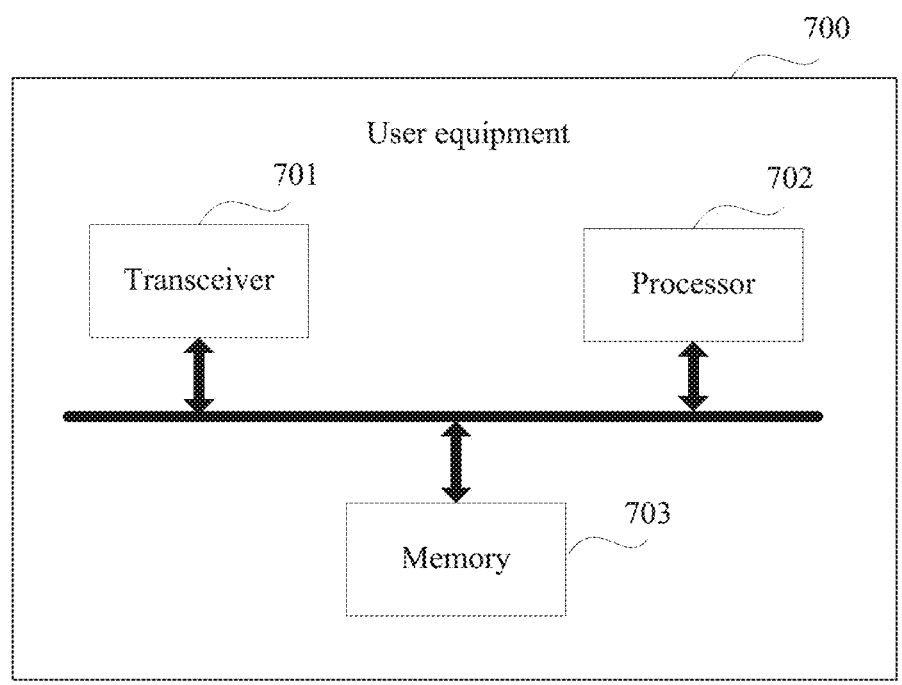
FIG. 7 is a schematic structural diagram of user equipment according to this application.

Based on the foregoing embodiment, this application further provides user equipment, capable of implementing at least one of the foregoing method embodiments. Referring to FIG. 7, the user equipment 700 includes a transceiver 701, a processor 702, and a memory 703.

The memory 703 is configured to store a computer executable instruction. When the processor 702 executes the computer executable instruction, the user equipment 700 performs one of the foregoing method embodiments.

It may be understood that the random access apparatus in the embodiment shown in FIG. 6 may be implemented by the user equipment 700 shown in FIG. 7. A structure of the user equipment 700 does not constitute a limitation to the embodiments of this application.

The user equipment 700 can implement at least one of the foregoing method or apparatus embodiments. For details, refer to the foregoing method and apparatus embodiments, and details are not described in this application again.

The processor 702 may be a central processing unit (central processing unit, CPU), a network processor (network processor, NP), a hardware chip, or any combination thereof. The memory may include a volatile memory (volatile memory) such as a random access memory (random access memory, RAM), or the memory may include a non-volatile memory (non-volatile memory) such as a read-only memory (read-only memory, ROM), a flash memory (flash memory), a hard disk drive (hard disk drive, HDD), or a solid-state drive (solid-state drive. SSD), or the memory may include a combination of the foregoing types of memories.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in various embodiments of this application, sequence numbers of the foregoing processes do not mean execution sequences. The execution sequences of the processes should be determined according to functions and internal logic of the processes, and should not be construed as any limitation to the implementation processes of the embodiments of the present invention.

Mutual reference may be made to related parts in the method embodiments of this application. The apparatuses provided in the apparatus embodiments are configured to perform the methods provided in the corresponding method embodiments. Therefore, for the apparatus embodiments, refer to the related parts in the related method embodiments for understanding.

Structural diagrams of the apparatuses in the apparatus embodiments of this application merely show simplified designs of the corresponding apparatuses. In actual application, the apparatus may include any quantities of transmitters, receivers, processors, memories, and the like, to implement functions or operations performed by the apparatuses in the apparatus embodiments of this application, and all apparatuses that can implement this application fall within the protections scope of this application.

Names of message/frame/indication information, modules, units, or the like in the embodiments of this application are merely an example, and another name may be used provided that the message/frame/indication information, modules, or units have same functions.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, and an optical memory) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations of the embodiments of this application provided that they fall within the scope of the claims of this application and their equivalent technologies.

What is claimed is:

1. A random access method implemented by a user equipment (UE), comprising:
   working on a first bandwidth part (BWP), wherein the first BWP is a currently active BWP; and
   when the UE performs a random access procedure:
      performing the random access procedure on an initial BWP when the first BWP does not meet a first condition for performing the random access procedure, wherein the initial BWP is from a network device in system information; and
      performing the random access procedure on the first BWP when the first BWP meets the first condition,
   wherein the random access method further comprises:
      receiving BWP switching indication information from the network device when the UE performs the random access procedure on the first BWP, wherein the BWP switching indication information instructs the UE to use a second BWP; and
      either continuing to perform the random access procedure on the first BWP, or stopping performing the random access procedure on the first BWP and initiating the random access procedure on the second BWP, wherein the UE chooses whether to continue to complete the random access procedure on the first BWP or to switch to the second BWP to complete the random access procedure based on an amount of time to complete the random access procedure.

2. The random access method of claim 1, further comprising:
   identifying that the initial BWP meets the first condition; and
   performing, in response to the identifying, the random access procedure on the initial BWP.

3. The random access method of claim 1, further comprising:
   identifying that the second BWP meets the first condition; and
   initiating, in response to the identifying, the random access procedure on the second BWP.

4. The random access method of claim 1, wherein meeting the first condition comprises identifying that a resource used for random access is available.

5. The random access method of claim 1, wherein not meeting the first condition comprises identifying that a resource used for random access is not configured.

6. The random access method of claim 1, wherein the performing, by the UE, the random access procedure on the first BWP comprises any one or more of the following:
   skipping deactivating the first BWP;
   keeping the first BWP activated; or
   stopping a bandwidth part inactivity timer that maintains the first BWP.

7. The random access method of claim 1, wherein the initiating, by the UE, the random access procedure on the second BWP comprises any one or more of the following:
   setting a power ramping counter to a first initial value; or
   setting a backoff parameter to a second initial value.

8. The random access method of claim 1, wherein the initiating, by the UE, the random access procedure on the second BWP comprises any one or more of the following:
   continuing to use a value of a power ramping counter of the UE; or
   continuing to use a backoff parameter of the UE.

9. The random access method of claim 1, wherein the first BWP comprises a first uplink (UL) BWP or a first downlink (DL) BWP, wherein the second BWP comprises a second UL BWP or a second DL BWP, wherein the BWP switching indication information instructs the UE to use the second UL BWP, the second DL BWP, or both the second UL BWP and the second DL BWP, and wherein the BWP switching indication information further instructs the UE to switch the first UL BWP, the first DL BWP, or the first UL BWP and the first DL BWP.

10. A user equipment (UE), comprising:
    a processor configured to:
       work on a first bandwidth part (BWP), wherein the first BWP is a currently active BWP; and
       when the UE performs a random access procedure:
          enable the UE to perform the random access procedure on an initial BWP when the first BWP does not meet a first condition for performing the random access procedure, wherein the initial BWP is from a network device in system information; and
          enable the UE to perform the random access procedure on the first BWP when the first BWP meets the first condition; and
    a transceiver coupled to the processor and configured to receive BWP switching indication information from the network device when the UE performs the random access procedure on the first BWP, wherein the BWP switching indication information instructs the UE to use a second BWP,
    wherein after the transceiver receives the BWP switching indication information, the processor is further configured to:
       enable the UE to continue to perform the random access procedure on the first BWP; or
       enable the UE to stop performing the random access procedure on the first BWP and initiate the random access procedure on the second BWP, wherein the UE chooses whether to continue to complete the random access procedure on the first BWP or to switch to the second BWP to complete the random access procedure based on an amount of time to complete the random access procedure.

11. The UE of claim 10, wherein the processor is further configured to:
    identify that the initial BWP meets the first condition; and
    perform, in response to the initial BWP meeting the first condition, the random access procedure on the initial BWP.

12. The UE of claim 10, wherein the processor is further configured to:
  identify that the second BWP meets the first condition; and
  initiate, in response to the second BWP meeting the first condition, the random access procedure on the second BWP.

13. The UE of claim 10, wherein when identifying that the first BWP meets the first condition, the processor is further configured to identify that a resource used for random access is available.

14. The UE of claim 10, wherein when identifying that the first BWP does not meet the first condition, the processor is further configured to identify that a resource used for random access is not configured.

15. The UE of claim 10, wherein when performing the RA procedure on the first BWP, the processor is further configured to perform at least one of:
  skip deactivating the first BWP;
  keep the first BWP activated; or
  stop a bandwidth part inactivity timer that maintains the first BWP.

16. The UE of claim 10, wherein the first BWP comprises a first uplink (UL) BWP or a first downlink (DL) BWP, wherein the second BWP comprises a second UL BWP or a second DL BWP, wherein the BWP switching indication information instructs the UE to use the second UL BWP, the second DL BWP, or both the second UL BWP and the second DL BWP, and wherein the BWP switching indication information further instructs the UE to switch the first UL BWP, the first DL BWP, or the first UL BWP and the first DL BWP.

17. A computer program product comprising computer-executable instructions for storage on a non-transitory computer-readable medium that, when executed by a processor, cause a user equipment (UE) to:
  work on a first bandwidth part (BWP), wherein the first BWP is a currently active BWP;
  when the UE performs a random access procedure:
    perform the random access procedure on an initial BWP when the first BWP does not meet a first condition for performing the random access procedure, wherein the initial BWP is from a network device in system information; and
    perform the random access procedure on the first BWP when the first BWP meets the first condition;
  receive BWP switching indication information from the network device when the UE performs the random access procedure on the first BWP, wherein the BWP switching indication information instructs the UE to use a second BWP; and
  wherein either:
    continue to perform the random access procedure on the first BWP; or
    stop performing the random access procedure on the first BWP and initiate the random access procedure on the second BWP, wherein the UE chooses whether to continue to complete the random access procedure on the first BWP or to switch to the second BWP to complete the random access procedure based on an amount of time to complete the random access procedure.

18. The computer program product of claim 17, wherein the computer-executable instructions further cause the UE to:
  identify that the initial BWP meets the first condition; and
  perform, in response to the initial BWP meeting the first condition, the random access procedure on the initial BWP.

19. The computer program product of claim 17, wherein the computer-executable instructions further cause the UE to:
  identify that the second BWP meets the first condition; and
  initiate, in response to the second BWP meeting the first condition, the random access procedure on the second BWP.

20. The computer program product of claim 17, wherein when identifying that the first BWP meets the first condition, the computer-executable instructions further cause the UE to identify that a resource used for random access is available.

* * * * *